United States Patent
Je et al.

(10) Patent No.: US 12,250,605 B2
(45) Date of Patent: Mar. 11, 2025

(54) METHOD AND DEVICE FOR HANDING OVER TERMINAL IN WIRELESS COMMUNICATION SYSTEM USING ARTIFICIAL INTELLIGENCE

(71) Applicant: Samsung Electronics Co., Ltd., Gyeonggi-do (KR)

(72) Inventors: Donghyun Je, Gyeonggi-do (KR); Byunghyun Lee, Gyeonggi-do (KR); Jungsoo Jung, Gyeonggi-do (KR); Byounghoon Jung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 17/776,505

(22) PCT Filed: Nov. 3, 2020

(86) PCT No.: PCT/KR2020/015208
§ 371 (c)(1),
(2) Date: May 12, 2022

(87) PCT Pub. No.: WO2021/096141
PCT Pub. Date: May 20, 2021

(65) Prior Publication Data
US 2022/0386196 A1 Dec. 1, 2022

(30) Foreign Application Priority Data
Nov. 12, 2019 (KR) .................. 10-2019-0144311

(51) Int. Cl.
*H04W 24/02* (2009.01)
*H04W 24/10* (2009.01)
(Continued)

(52) U.S. Cl.
CPC .......... *H04W 36/249* (2023.05); *H04W 24/02* (2013.01); *H04W 24/10* (2013.01);
(Continued)

(58) Field of Classification Search
CPC ...... G06N 3/02–105; G06N 20/00–20; H04W 24/02–10; H04W 36/0005–385;
(Continued)

(56) References Cited

U.S. PATENT DOCUMENTS 7,876,729 B1 1/2011 Grilli et al.
8,072,938 B2 12/2011 Lee et al.
(Continued)

FOREIGN PATENT DOCUMENTS

EP 3051877 8/2016
EP 3051877 A1 * 8/2016 ........ H04W 36/0061
(Continued)

OTHER PUBLICATIONS

PCT/ISA/210 Search Report issued on PCT/KR2020/015208, Feb. 22, 2021 pp. 7.
(Continued)

Primary Examiner — Timothy J Weidner
(74) Attorney, Agent, or Firm — The Farrell Law Firm, P.C.

(57) ABSTRACT

The present disclosure relates to a 5G or 6G communication system supporting higher data transmission rates than 4G systems such as LTE systems. The present invention of the present disclosure pertains to a method for handing over a terminal in a wireless communication system, wherein the method is characterized by: receiving handover control reference information from a base station; determining whether to perform a handover on the basis of the handover control reference information and wireless signal information acquired through the measurement of a wireless signal; and transmitting a handover request message to the base station when it is determined that handover is to be performed.

14 Claims, 21 Drawing Sheets

(51) Int. Cl.
  *H04W 36/00* (2009.01)
  *H04W 36/24* (2009.01)
  *H04W 36/30* (2009.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ... *H04W 36/0058* (2018.08); *H04W 36/0083* (2013.01); *H04W 36/0094* (2013.01); *H04W 36/302* (2023.05); *H04W 36/305* (2018.08); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC ..... H04W 84/02–16; H04W 88/02–12; H04W 92/02–04; H04W 92/10
  See application file for complete search history.

(56) References Cited

U.S. PATENT DOCUMENTS

| | | | |
|---|---|---|---|
| 10,524,179 B2 | 12/2019 | Anchan et al. | |
| 2006/0140117 A1* | 6/2006 | Aerrabotu | ............ H04W 36/26 |
| 2007/0293224 A1 | 12/2007 | Wang et al. | |
| 2011/0103347 A1* | 5/2011 | Dimou | ............ H04W 36/0016 |
| 2022/0322163 A1* | 10/2022 | Awada | ............ H04W 36/0085 |

FOREIGN PATENT DOCUMENTS

| | | | | |
|---|---|---|---|---|
| KR | 10-0746069 | | 7/2007 | |
| KR | 10-0810479 | | 2/2008 | |
| KR | 10-1319870 | | 10/2013 | |
| KR | 10-1490340 | | 1/2015 | |
| KR | 10-1596109 | | 2/2016 | |
| KR | 10-2017-0137082 | * | 12/2017 | ............ H04W 36/30 |

OTHER PUBLICATIONS

PCT/ISA/237 Written Opinion issued on PCT/KR2020/015208, Feb. 22, 2021, pp. 4.

Panasonic, "Discussion on the leaving conditions for CHO", R2-1912693, 3GPP TSG RAN WG2 Meeting #107bis, Chongqing, China, Oct. 2, 2019, pp. 5.

Spreadtrum Communications, "Measurement report enhancement in conditional handover", R2-1912240, 3GPP TSG RAN WG2 Meeting #107bis, Chongqing, China, Oct. 1, 2019, pp. 4.

Vivo, "Conditional handover without explicit trigger condition", R2-1912339, 3GPP TSG RAN WG2 Meeting #107bis, Chongqing, China, Oct. 4, 2019, pp. 6.

* cited by examiner

METHOD AND DEVICE FOR HANDING OVER TERMINAL IN WIRELESS COMMUNICATION SYSTEM USING ARTIFICIAL INTELLIGENCE

PRIORITY

This application is a National Phase Entry of PCT International Application No. PCT/KR2020/015208, which was filed on Nov. 3, 2020, and claims priority to Korean Patent Application No. 10-2019-0144311, which was filed on Nov. 12, 2019, the entire content of each of which is incorporated herein by reference.

TECHNICAL FIELD

The disclosure relates to a method and device for performing a handover by a terminal in a wireless communication system.

BACKGROUND ART

A review of the development of mobile communication from generation to generation shows that the development has mostly been directed to technologies for services targeting humans, such as voice-based services, multimedia services, and data services. It is expected that connected devices which are exponentially increasing after commercialization of 5G communication systems will be connected to communication networks. Examples of things connected to networks may include vehicles, robots, drones, home appliances, displays, smart sensors connected to various infrastructures, construction machines, and factory equipment. Mobile devices are expected to evolve in various formfactors, such as augmented reality glasses, virtual reality headsets, and hologram devices. In order to provide various services by connecting hundreds of billions of devices and things in the 6G era, there have been ongoing efforts to develop improved 6G communication systems. For these reasons, 6G communication systems are referred to as Beyond-5G systems.

6G communication systems, which are expected to be implemented approximately by 2030, will have a maximum transmission rate of tera (1,000 giga)-level bps and a radio latency of 100 μsec, and thus will be 50 times as fast as 5G communication systems and have the 1/10 radio latency thereof.

In order to accomplish such a high data transmission rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, a technology capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the frequency efficiencies and system networks, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; a network structure innovation technology for supporting mobile nodes B and the like and enabling network operation optimization and automation and the like; a dynamic spectrum sharing technology though collision avoidance based on spectrum use prediction, an artificial intelligence (AI)-based communication technology for implementing system optimization by using AI from the technology design step and internalizing end-to-end AI support functions; and a next-generation distributed computing technology for implementing a service having a complexity that exceeds the limit of UE computing ability by using super-high-performance communication and computing resources (mobile edge computing (MEC), clouds, and the like). In addition, attempts have been continuously made to further enhance connectivity between devices, further optimize networks, promote software implementation of network entities, and increase the openness of wireless communication through design of new protocols to be used in 6G communication systems, development of mechanisms for implementation of hardware-based security environments and secure use of data, and development of technologies for privacy maintenance methods.

It is expected that such research and development of 6G communication systems will enable the next hyper-connected experience in new dimensions through the hyper-connectivity of 6G communication systems that covers both connections between things and connections between humans and things. Particularly, it is expected that services such as truly immersive XR, high-fidelity mobile holograms, and digital replicas could be provided through 6G communication systems. In addition, with enhanced security and reliability, services such as remote surgery, industrial automation, and emergency response will be provided through 6G communication systems, and thus these services will be applied to various fields including industrial, medical, automobile, and home appliance fields.

In cellular communication, in order to guarantee mobility of a terminal, when the terminal moves from a service area of a currently connected cell (or base station) to a service area of another cell, a handover which provides a service without interruption is supported.

DISCLOSURE OF INVENTION

Technical Problem

In order to efficiently perform a handover, there is a need for a terminal to determine whether to perform a handover, and the disclosure proposes a specific method for determining by a terminal whether to perform a handover.

Solution to Problem

The disclosure to solve the described task relates to a method for a handover of a terminal in a wireless communication system, the method including: receiving handover control criteria information from a base station; determining whether to perform a handover, based on the handover control criteria information and radio signal information acquired via measurement of a radio signal; when it is determined to perform the handover, transmitting a handover request message to the base station; and determining whether a handover command message is received from the base station.

A terminal for a handover in a wireless communication system includes: a transceiver; and a controller connected to the transceiver and configured to perform control to receive handover control criteria information from a base station, determine whether to perform a handover, based on the handover control criteria information and radio signal information acquired via measurement of a radio signal, transmit, when it is determined to perform the handover, a handover request message to the base station, and determine whether a handover command message is received from the base station.

Advantageous Effects of Invention

According to the disclosure, a terminal may perform a handover appropriate for a state and environment of each terminal, based on directly measured real-time radio signal information, and accordingly the terminal may be provided with a high radio signal quality and a seamless service.

MODE FOR THE INVENTION

Figure 1:
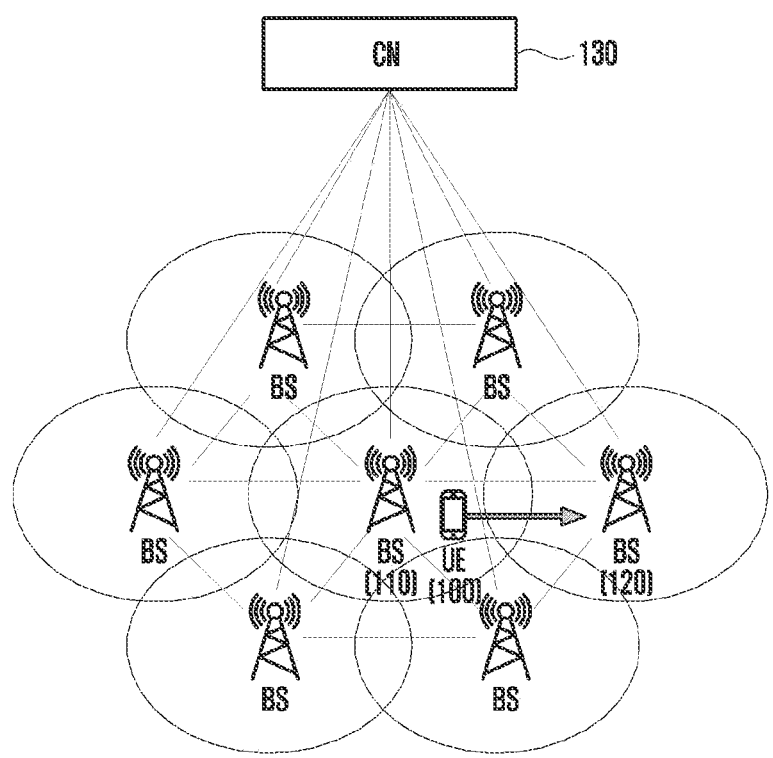
FIG. 1 is a diagram illustrating an example of base station installation and an example of changing a connected base station as a terminal (user equipment (UE)) moves, in a mobile communication system.

A wireless communication system has been developed from a wireless communication system providing a voice centered service in the early stage toward broadband wireless communication systems providing high-speed, high-quality packet data services, such as communication standards, for example, high speed packet access (HSPA), long-term evolution (LTE) or evolved universal terrestrial radio access (E-UTRA), LTE-advanced (LTE-A), and LTE-Pro of 3GPP, high rate packet data (HRPD) and ultra-mobile broadband (UMB) of 3GPP2, 802.16e of IEEE, and the like.

In an LTE system, which is a representative example of the broadband wireless communication system, a downlink (DL) adopts an orthogonal frequency division multiplexing (OFDM) scheme, and an uplink (UL) adopts a single carrier frequency division multiple access (SC-FDMA) scheme. The uplink refers to a radio link via which a terminal (user equipment (UE) or mobile station (MS)) transmits data or a control signal to a base station (generation Node B (gNB), eNode B (eNB), or base station (BS)), and the downlink refers to a radio link via which a base station transmits data or a control signal to a terminal. In the multi-access scheme as described above, in general, data or control information of each user is distinguished by assigning and operating time-frequency resources, in which data or control information of each user is transmitted, so as not to overlap each other, that is, to establish orthogonality.

A 5G communication system, that is, a future communication system after LTE, should be able to freely reflect various requirements of users, service providers, etc. so that a service that concurrently satisfies various requirements should be supported. Services considered for the 5G communication system include an enhanced mobile broadband (eMBB), massive machine type communication (mMTC), ultra-reliability low latency communication (URLLC), and the like. The eMBB aims to provide a data transmission rate that is more improved than a data transmission rate supported by existing LTE, LTE-A or LTE-Pro. For example, in the 5G communication system, an eMBB should be able to provide a maximum data rate (peak data rate) of 20 Gbps in a downlink and a peak data rate of 10 Gbps in an uplink from the perspective of one base station. The 5G communication system needs to provide a maximum data rate while concurrently providing an increased actual user perceived data rate of a terminal. In order to satisfy these requirements, improvement of various transmission or reception technologies including a more advanced multi-antenna (multi-input multi-output (MIMO)) transmission technology is required. In addition, in a band of 2 GHz used by current LTE, a signal is transmitted using a maximum transmission bandwidth of 20 MHz, whereas, in the 5G communication system, a data transmission rate, which is required by the 5G communication system, may be satisfied by using a frequency bandwidth wider than 20 MHz in a frequency band of 3 to 6 GHz or a frequency band of 6 GHz or higher.

Meantime, mMTC is being considered to support application services, such as Internet of things (IoT), in the 5G communication system. In order to efficiently provide IoT, mMTC may require support of a large-scale terminal access in a cell, coverage enhancement of a terminal, an improved battery time, cost reduction of a terminal, and the like. IoT is attached to multiple types of sensors and various devices to provide communication functions, so that IoT should be able to support a large number of terminals (e.g., 1,000,000 terminals/km2) within a cell. Due to the nature of a service, a terminal that supports mMTC is likely to be located in a shaded area, which cannot be covered by a cell, such as a basement of a building, and therefore a wider coverage may be required compared to other services provided by the 5G communication system. The terminal that supports mMTC may be required to be a low-cost terminal, and since it is difficult to frequently replace a battery of the terminal, a very long battery life time, such as 10 to 15 years, may be required.

Finally, URLLC is a cellular-based wireless communication service used for a specific purpose (mission-critical). For example, services, etc. used for a remote control of a robot or machinery, industrial automation, an unmanned aerial vehicle, remote health care, an emergency alert, and the like may be considered. Therefore, communication provided by URLLC should also provide very low latency and very high reliability. For example, a service that supports URLLC has requirements of an air interface latency less than 0.5 milliseconds and a packet error rate of 10-5 or less at the same time. Therefore, for the service that supports the URLLC, the 5G system should provide a transmit time interval (TTI) that is smaller than those of other services, and also requires a design to allocate wide resources in a frequency band in order to secure reliability of a communication link.

Three services of 5G, which are eMBB, URLLC, and mMTC, may be multiplexed and transmitted in a single system. At this time, different transmission/reception techniques and transmission/reception parameters may be used between services to satisfy different requirements of respective services.

In communication, more advanced services, such as mobile hologram, virtual reality, and augmented reality, are emerging. In order to support these services, in communication systems, element technologies, such as an artificial intelligence (AI) technology, a sensing technology, a wired/wireless communication and network infrastructure, a service interface technology, and a security technology, are being studied.

Hereinafter, an embodiment of the disclosure will be described in detail with reference to the accompanying drawings.

In describing embodiments, descriptions related to technical contents which are well-known in the art, to which the disclosure belongs, and are not associated directly with the disclosure will be omitted. Such an omission of unnecessary descriptions is intended to prevent obscuring of the main idea of the disclosure and more clearly convey the main idea.

For the same reason, in the accompanying drawings, some elements may be exaggerated, omitted, or schematically illustrated. Further, the size of each element does not completely reflect an actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of process flowcharts and combinations of the flowcharts may be performed by computer program instructions. These computer program instructions may be loaded on a processor of a general purpose computer, a special purpose computer, or other programmable data processing equipment, so that the instructions executed by the processor of the computer or other programmable data processing equipment generate a means for executing functions described in the flowchart block(s). These computer program instructions can also be stored in a computer-usable or computer-readable memory, which may direct a computer or other programmable data processing equipment, to implement a function in a particular manner so that, for the instructions stored in the computer-usable or computer-readable memory, a manufacture product including an instruction means that performs the function described in the flowchart block(s) can be produced. The computer program instructions can also be loaded onto a computer or other programmable data processing equipment to cause a series of operations to be performed on the computer or other programmable data processing equipment to produce a computer-executed process, so that the instructions for driving of the computer or other programmable data processing equipment provide operations for executing the functions described in the flowchart block(s).

Further, each block may represent a module, segment, or a part of codes, which includes one or more executable instructions for implementation of the specified logical function(s). It should also be noted that, in some alternative implementations, the functions described in the blocks can occur out of the order. For example, two blocks shown in succession may in fact be executed substantially concurrently or the blocks may sometimes be executed in the reverse order, depending upon the functionality involved.

In this case, the term "-unit" used in the embodiment refers to hardware components, such as FPGA or ASIC, or software, and "-unit" performs certain roles. However, the "-unit" is not limited to software or hardware. The "-unit" may be configured either to be stored in an addressable storage medium or to execute one or more processors. Therefore, for example, the "-unit" includes elements, such as software elements, object-oriented software elements, class elements, and task elements, processes, functions, properties, procedures, sub-routines, segments of a program code, drivers, firmware, micro-codes, circuits, data, database, data structures, tables, arrays, and parameters. The elements and functions provided by the "-unit" may be either combined into a smaller number of elements, or "-units", or divided into additional elements, or "-units". Moreover, the elements and "-units" or may be implemented to reproduce one or more CPUs within a device or a security multimedia card. Further, the "-unit" in the embodiments may include one or more processors.

Terms used for identifying a connection node, terms indicating network entities, terms indicating messages, terms indicating interfaces between network objects, terms indicating various identification information, etc. used in the following description are illustrated for convenience of explanation. Therefore, the disclosure is not limited to the terms used herein, and other terms referring to objects having equivalent technical meanings may be used.

For convenience of description, terms and names defined in the standards of 5G, NR, and LTE systems are used in the disclosure. However, the disclosure is not limited by the terms and names, and may be equally applied to systems conforming to other standards.

That is, embodiments of the disclosure will be described in detail mainly with respect to communication standards defined by the 3GPP. However, the main subject of the disclosure may be applied to other communication systems having a similar technical background, by making slight changes therein without departing from the scope of the disclosure, as determined by those skilled in the art of the disclosure.

Hereinafter, the structures of LTE and LTE-A systems will be described in more detail with reference to the drawings.

FIG. 1 is a diagram illustrating an example of base station installation and an example of changing a connected base station as a terminal (user equipment (UE)) moves, in a mobile communication system.

According to FIG. 1, base stations 110 and 120 may be connected to some of neighboring base stations, and the base stations 110 and 120 may connected to a mobile communication core network (CN) 130, such as an evolved packet core (EPC) or a 5G core network (5GC). Radio access technologies of the base stations 110 and 120 may be LTE, NR, Wi-Fi, or the like, but are not limited to the above example. A terminal 100 may be connected to a base station to receive a mobile communication service, and the terminal 100 may continuously receive the mobile communication service without interruption via a handover (HO, or handoff) procedure in which a connected base station is changed as the terminal 100 moves. In the example of FIG. 1, the terminal is connected to the base station 110, and then the terminal is disconnected from the base station 110 and is connected to a new base station 120 via a handover.

Figure 2:
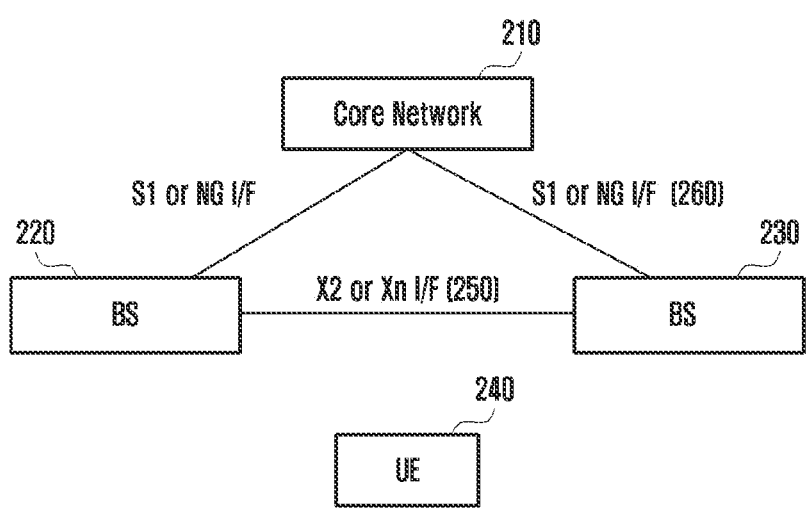
FIG. 2 is a diagram illustrating an example of a structure of a mobile communication system to which the technology of the disclosure is applicable.

FIG. 2 is a diagram illustrating an example of a structure of a mobile communication system to which the technology of the disclosure is applicable. A base station (BS) 220 specified in this structure may be a mobile communication base station independent of a radio access technology, such as LTE eNB, NR gNB, or Wi-Fi AP connected to a mobile communication core network 210 such as EPC or 5GC. The BS may be configured as one unit or divided into multiple units. A base station of such configuration supports respective mobile communication functions by dividing the same. Examples of these functions may include a packet data convergence protocol (PDCP), a radio link control (RLC), a medium access control (MAC), a physical layer (PHY), a radio frequency (RF) layer, etc., and one unit may support the functions, the functions may be distributed and supported by multiple units, or one function may be divided and supported by one or more units. The BSs are connected to an interface between the BSs, such as an X2 or Xn interface 150, and the BS is connected to the CN 210 via an interface between the base station and the core network, such as an S1 or NG interface 260. The technology proposed in the disclosure may operate when a terminal is connected to a base station regardless of an internal configuration of the base station, and the terminal performs handover between base stations when moving.

Figure 3:
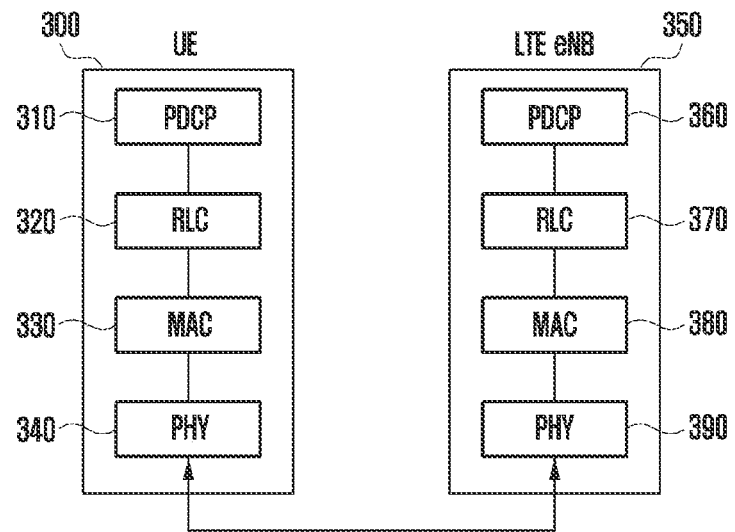
FIG. 3 is a diagram illustrating a radio protocol structure in an LTE system to which the disclosure is applicable.

FIG. 3 is a diagram illustrating a radio protocol structure in an LTE system to which the disclosure is applicable.

Referring to FIG. 3, radio protocols of the LTE system include PDCPs 310 and 360, RLCs 320 and 370, and MACs 330 and 380 in a terminal 300 and abase station 350, respectively. Elements of the radio protocols may be referred to as layers, entities, or devices.

The PDCPs 310 and 360 are in charge of operations, such as IP header compression/restoration. Main functions of the PDCPs are summarized as follows.

Header compression and decompression function (header compression and decompression: ROHC only)
    User data transmission function (transfer of user data)
    Sequential transfer function (in-sequence delivery of upper layer PDUs at PDCP re-establishment procedure for RLC AM)
    Reordering function (for split bearers in DC (only support for RLC AM): PDCP PDU routing for transmission and PDCP PDU reordering for reception)
    Duplicate detection function (duplicate detection of lower layer service data units (SDUs) at PDCP re-establishment procedure for RLC AM)
    Retransmission function (retransmission of PDCP SDUs at handover and, for split bearers in DC, of PDCP PDUs at PDCP data-recovery procedure, for RLC AM)
    Encryption and decryption function (ciphering and deciphering)
    Timer-based SDU discard function (timer-based SDU discard in uplink)

RLCs 320 and 370 perform an ARQ operation, etc. by reconfiguring a PDCP packet data unit (PDU) to an appropriate size. Main functions of the RLC are summarized as follows.

Data transmission function (transfer of upper layer PDUs)
    ARQ function (error correction through ARQ (only for AM data transfer))
    Concatenation, segmentation, and reassembly function (concatenation, segmentation, and reassembly of RLC SDUs (only for UM and AM data transfer))
    Re-segmentation function (re-segmentation of RLC data PDUs (only for AM data transfer))
    Reordering function (reordering of RLC data PDUs (only for UM and AM data transfer)
    Duplicate detection function (duplicate detection (only for UM and AM data transfer))
    Error detection function (protocol error detection (only for AM data transfer))
    RLC SDU discard function (RLC SDU discard (only for UM and AM data transfer))
    RLC re-establishment function (RLC re-establishment)

The MACs 330 and 380 are connected to multiple RLC layer devices included in one terminal, and perform multiplexing of RLC PDUs to an MAC PDU and demultiplexing of the RLC PDUs from the MAC PDU. Main functions of the MACs are summarized as follows.

Mapping function (mapping between logical channels and transport channels)
    Multiplexing and demultiplexing function (multiplexing/demultiplexing of MAC SDUs belonging to one or different logical channels into/from transport blocks (TB) delivered to/from the physical layer on transport channels)
    Scheduling information reporting function (scheduling information reporting)

HARQ function (error correction through HARQ)
Function of adjusting priority between logical channels (priority handling between logical channels of one UE)
Function of adjusting priority between terminals (priority handling between UEs by means of dynamic scheduling)
MBMS service identification function (MBMS service identification)
Transmission format selection function (transport format selection)
Padding function (padding)

The physical layers 340 and 390 perform operations of channel-coding and modulating upper layer data, and making the channel-coded and modulated upper layer data into OFDM symbols to transmit the OFDM symbols through a radio channel, or demodulating and channel-decoding the OFDM symbols received through the radio channel, thereby transferring the same to an upper layer.

Figure 4:
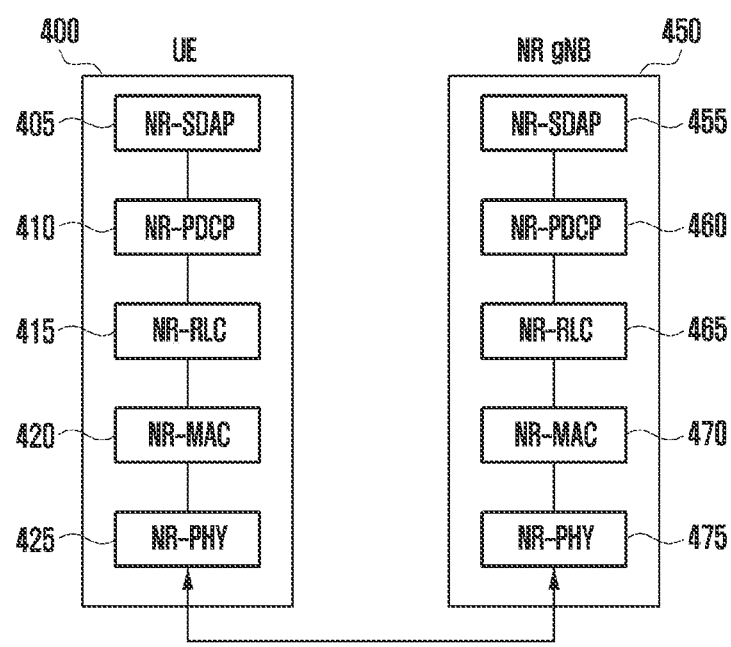
FIG. 4 is a diagram illustrating a radio protocol structure in a next-generation mobile communication system applicable in the disclosure.

FIG. 4 is a diagram illustrating a radio protocol structure in a next-generation mobile communication system applicable in the disclosure. Referring to FIG. 4, radio protocols of the next-generation mobile communication system include service data application protocols (NR SDAPs) 405 and 455, NR PDCPs 410 and 460, NR RLCs 415 and 465, and NR MACs 420 and 470 in both a terminal 400 and an NR base station 450, respectively. Elements of the radio protocols may be referred to as layers, entities, or devices.

Main functions of the NR SDAPs 405 and 455 may include some of the following functions.

User data transfer function (transfer of user plane data)
Function of mapping a QoS flow and a data bearer for an uplink and a downlink (mapping between a QoS flow and a DRB for both DL and UL)
Function of marking a QoS flow ID in an uplink and a downlink (marking QoS flow ID in both DL and UL packets)
Function of mapping a reflective QoS flow to a data bearer for each of uplink SDAP PDUs (reflective QoS flow to DRB mapping for the UL SDAP PDUs)

With respect to an SDAP layer device, the terminal may be configured, via an RRC message, whether to use a header of the SDAP layer device or whether to use a function of the SDAP layer device for each PDCP layer device, for each bearer, or for each logical channel, and if the SDAP header is configured, a NAS QoS reflection configuration 1-bit indicator (NAS reflective QoS) and an AS QoS reflection configuration 1-bit indicator (AS reflective QoS) in the SDAP header may indicate the terminal to update or reconfigure mapping information for data bearers and QoS flows in an uplink and a downlink. The SDAP header may include QoS flow ID information indicating QoS. The QoS information may be used as a data processing priority, scheduling information, etc. to support a smooth service.

Main functions of the NR SDAPs 410 and 460 may include some of the following functions. Header compression and decompression function (header compression and decompression: ROHC only)

User data transfer function (transfer of user data)
Sequential transfer function (in-sequence delivery of upper layer PDUs)
Non-sequential transfer function (out-of-sequence delivery of upper layer PDUs)
Reordering function (PDCP PDU reordering for reception)
Duplicate detection function (duplicate detection of lower layer SDUs)
Retransmission function (retransmission of PDCP SDUs)
Encryption and decryption function (ciphering and deciphering)
Timer-based SDU discard function (timer-based SDU discard in uplink)

In the above, the reordering function of an NR PDCP device refers to a function of rearranging the order of PDCP PDUs received in a lower layer, in the order based on PDCP sequence numbers (SN), may include a function of transferring data to an upper layer in the rearranged order or may include a function of directly transferring data without considering the order, may include a function of rearranging the order and recording lost PDCP PDUs, may include a function of reporting states of the lost PDCP PDUs to a transmission side, and may include a function of requesting to retransmit the lost PDCP PDUs.

Main functions of the NR SDAPs 415 and 465 may include some of the following functions.

Data transfer function (transfer of upper layer PDUs)
Sequential transfer function (in-sequence delivery of upper layer PDUs)
Non-sequential transfer function (out-of-sequence delivery of upper layer PDUs)
ARQ function (error correction through ARQ)
Concatenation, segmentation, and reassembly function (concatenation, segmentation and reassembly of RLC SDUs)
Re-segmentation function (re-segmentation of RLC data PDUs)
Reordering function (reordering of RLC data PDUs)
Duplicate detection function (duplicate detection)
Error detection function (protocol error detection)
RLC SDU discard function (RLC SDU discard)
RLC re-establishment function (RLC re-establishment)

In the above, the in-sequence delivery function of an NR RLC device refers to a function of delivering RLC SDUs, which are received from a lower layer, to an upper layer in order, wherein the in-sequence delivery function may include a function of, when originally one RLC SDU is divided into multiple RLC SDUs and then received, reassembling the divided RLC SDUs and delivering the same, may include a function of rearranging the received RLC PDUs on the basis of RLC sequence numbers (SNs) or PDCP sequence numbers (SNs), may include a function of rearranging the order and recording lost RLC PDUs, may include a function of reporting states of the lost RLC PDUs to a transmission side, may include a function of requesting to retransmit the lost RLC PDUs, and may include a function of, when there are lost RLC SDUs, delivering only RLC SDUs before the lost RLC SDUs to the upper layer in order. Alternatively, the in-sequence delivery function may include a function of, although there is a lost RLC SDU, if a predetermined timer has expired, delivering all RLC SDUs received before starting of the timer to the upper layer in order, or may include a function of, although there is a lost RLC SDU, if a predetermined timer has expired, delivering all RLC SDUs received up to the present time to the upper layer in order. In the above, the RLC PDUs may be processed in the order of reception thereof (in the order of arrival regardless of the sequence of serial numbers or SNs) and may be delivered to the PDCP device regardless of the order (out-of-sequence delivery). When the received RLC PDU is segments, segments stored in a buffer or to be received at a later time may be received, reconfigured into one complete RLC PDU, and then processed so as to be delivered to the PDCP device. The NR RLC layer may not include a concatenation function, and the function may be performed in an NR MAC layer or may be replaced with a multiplexing function of the NR MAC layer.

In the above, the out-of-sequence delivery function of the NR RLC device refers to a function of directly delivering the RLC SDUs received from the lower layer to an upper layer regardless of order, and may include a function of, when originally one RLC SDU is divided into multiple RLC SDUs and then received, reassembling the divided RLC SDUs and then delivering the same, and may include a function of storing the RLC SN or the PDCP SN of the received RLC PDUs and arranging the same so as to record the lost RLC PDUs.

The NR MACs 420 and 470 may be connected to multiple NR RLC layer devices included in one terminal, and main functions of the NR MACs may include some of the following functions.

- Mapping function (mapping between logical channels and transport channels)
- Multiplexing and demultiplexing function (multiplexing/demultiplexing of MAC SDUs)
- Scheduling information reporting function (scheduling information reporting)
- HARQ function (error correction through HARQ)
- Function of adjusting priority between logical channels (priority handling between logical channels of one UE)
- Function of adjusting priority between UEs (priority handling between UEs by means of dynamic scheduling)
- MBMS service identification function (MBMS service identification)
- Transmission format selection function (transport format selection)
- Padding function (padding)

Figure 5:
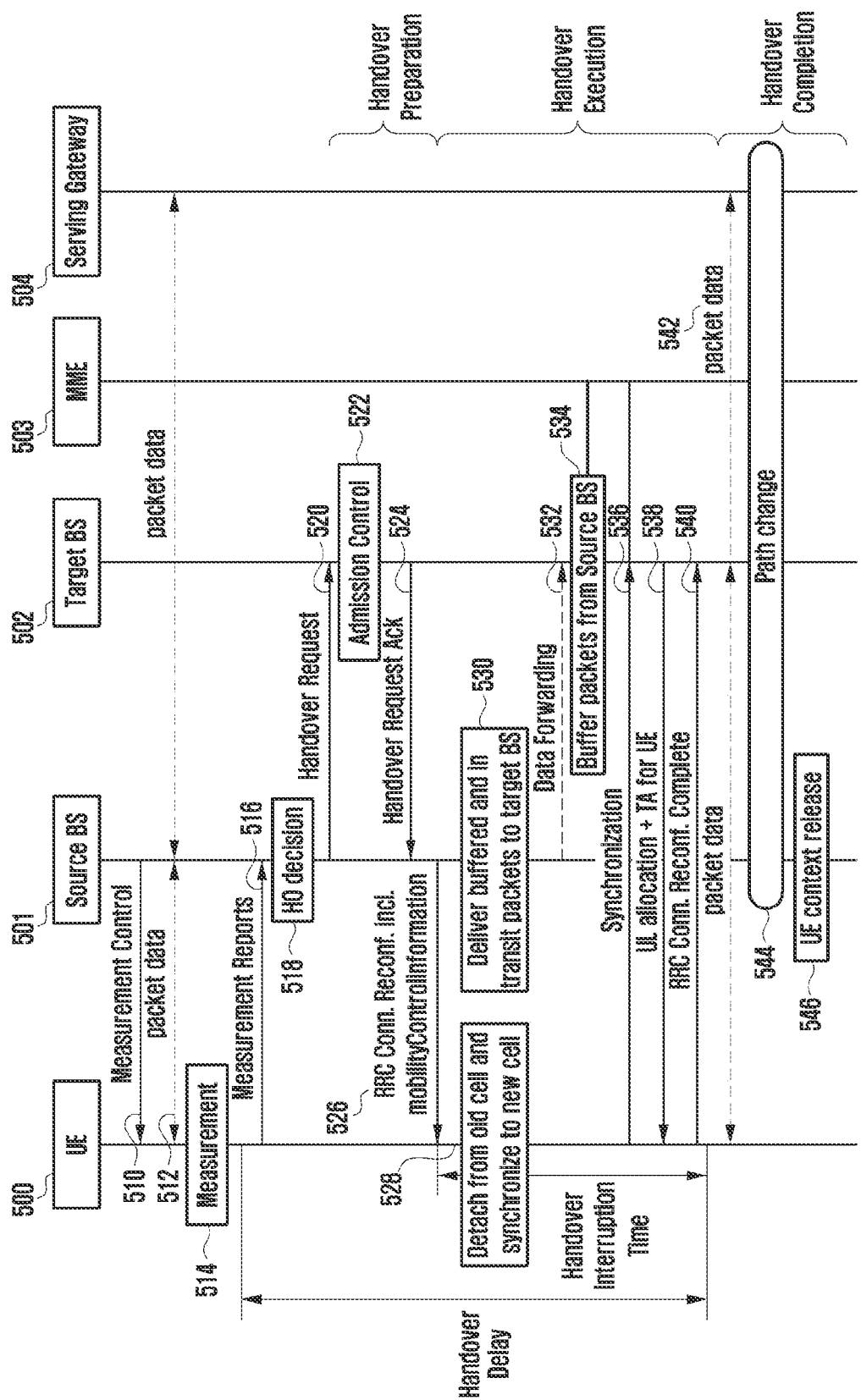
FIG. 5 is a diagram illustrating an example of a handover procedure according to the disclosure.

The NR PHY layers 425 and 475 may perform operations of channel-coding and modulating upper layer data and making the channel-coded and modulated upper layer data into OFDM symbols to transmit the OFDM symbols through a radio channel, or demodulating and channel-decoding the OFDM symbols received through the radio channel, thereby delivering the same to the upper layer. FIG. 5 is a diagram illustrating an example of a handover procedure according to the disclosure. Referring to FIG. 5, during a handover, a source base station (source BS) determines a target base station (target BS) according to an internal policy, based on measurement-related information transmitted by a terminal, and transmits radio configuration information received from the target base station to the terminal so that the terminal establishes a connection with the target base station. Via this procedure, the terminal performs the handover from the source base station to the target base station. A detailed procedure is as follows.

A source base station 501 transmits in 510 measurement control information, wherein the measurement control information may be information for configuration of a measurement report, such as a condition for triggering the measurement report, a measurement report period, etc. The measurement control information provided by the source base station is used to control mobility of a terminal. Thereafter, as normal communication is performed, data communication (packet data) is performed in 512. A terminal 500 measures in 514 intensities of radio signals of cells of neighboring base stations during a measurement operation, and when the condition according to the measurement control information is satisfied, the terminal 500 transmits in 516 a measurement report to the source base station 501. When the measurement report is received, the source base station 501 appropriately determines in 518 a handover of the terminal 500. Hereinafter, handover determination may be understood as determining whether to initiate a handover procedure, determining to initiate a handover procedure, or determining whether to perform handover.

The source base station 501 transmits, to the target base station 502, a handover request message for transferring of information necessary for preparing for a handover to the target base station 502, in 520. The target base station 502 performs in 522 admission control for determining whether to allow a handover, and during this procedure, the target base station 502 configures resources necessary for the terminal 500 to connect to the target base station 502. When handover preparation is completed, the target base station 502 transmits, to the source base station 501, a handover request acknowledgment (ACK) message including information necessary for the terminal to connect to the target base station, in 524. The handover request ACK message includes RRC connection reconfiguration message information received from the target base station, and the source base station 501 transmits, to the terminal 500, an RRC connection reconfiguration message including the RRC connection reconfiguration message information received from the target base station 502, in 526.

When the RRC connection reconfiguration message including a parameter required for the handover is received, the terminal 500 is detached from a previous cell and attempts synchronization for access to a new cell, in 528. The source base station 501 transmits a received packet (or data) to the target base station 502, in 530, 532. The target base station 502 receives the packet from the source base station 501. The terminal 500 performs synchronization with the target base station 502, and accesses the target base station through a random access channel (RACH), in 536. The target base station 502 allocates a UL resource to the terminal 500, and responds with a random access response (RAR) including timing advance (TA) information, in 538. The terminal 500 indicates in 540 that the handover is completed, by transmitting an RRC connection reconfiguration complete message to the target base station 502. Thereafter, the terminal 500 may receive packet data via the target base station 502, in 542.

The target base station 502 performs in 544 a path change procedure to a CN (mobility management entity (MME), etc.) 503 in order to notify that the terminal 500 has changed the cell. When a UE context release message is received from the CN 503, the source base station 501 performs UE context release in 546.

According to the procedure shown in FIG. 5, when a handover is performed, measurement control and measurement report are performed based on situations of a representative base station and/or a terminal, and since mobility parameters are designed based on the above information and the situations of the representative base station and/or the terminal, an efficient handover in consideration of the state and environment of an individual terminal may not be performed. In order to perform an efficient handover, the disclosure proposes a method and a device for receiving handover-related reference information by a terminal from a base station, wherein each terminal performs a handover determination according to an analysis result based on directly received or measured information. Accordingly, handover determination may be performed based on more frequent information rather than a measurement report, and since whether to perform a handover is determined based on information directly received or measured by a terminal, a handover according to a state and environment of each terminal is possible.

As in the example of FIG. 5, a handover is based on a measurement result according to a reactive operation transmitted when a specific condition (e.g., events A1, A2, A3, etc.) is satisfied, and a delay may thus occur. A radio signal intensity decrease problem may occur due to a delay of a handover, and therefore according to the disclosure, a terminal directly determines a handover in consideration of a terminal and environment, based on received or measured information. As some examples, a terminal may use an artificial intelligence (AI)-based method for handover determination.

As in the example of FIG. 5, a base station receives information measured by a terminal via a measurement report, and a handover is determined based on the measurement information, so that this measurement information is information delayed by the time from measuring of a radio signal intensity by the terminal to receiving of a measurement report by the base station. Therefore, the base station makes a determination with delayed information when determining a handover. According to the disclosure, by using information, which is directly received or measured by a terminal, for handover determination in real time, a handover may be determined by better reflection of a real-time state and environment of the terminal. It is also advantageous in that, by performing handover-related analysis by the terminal, a high computation amount required by a base station may be distributed to the terminal.

Figure 6:
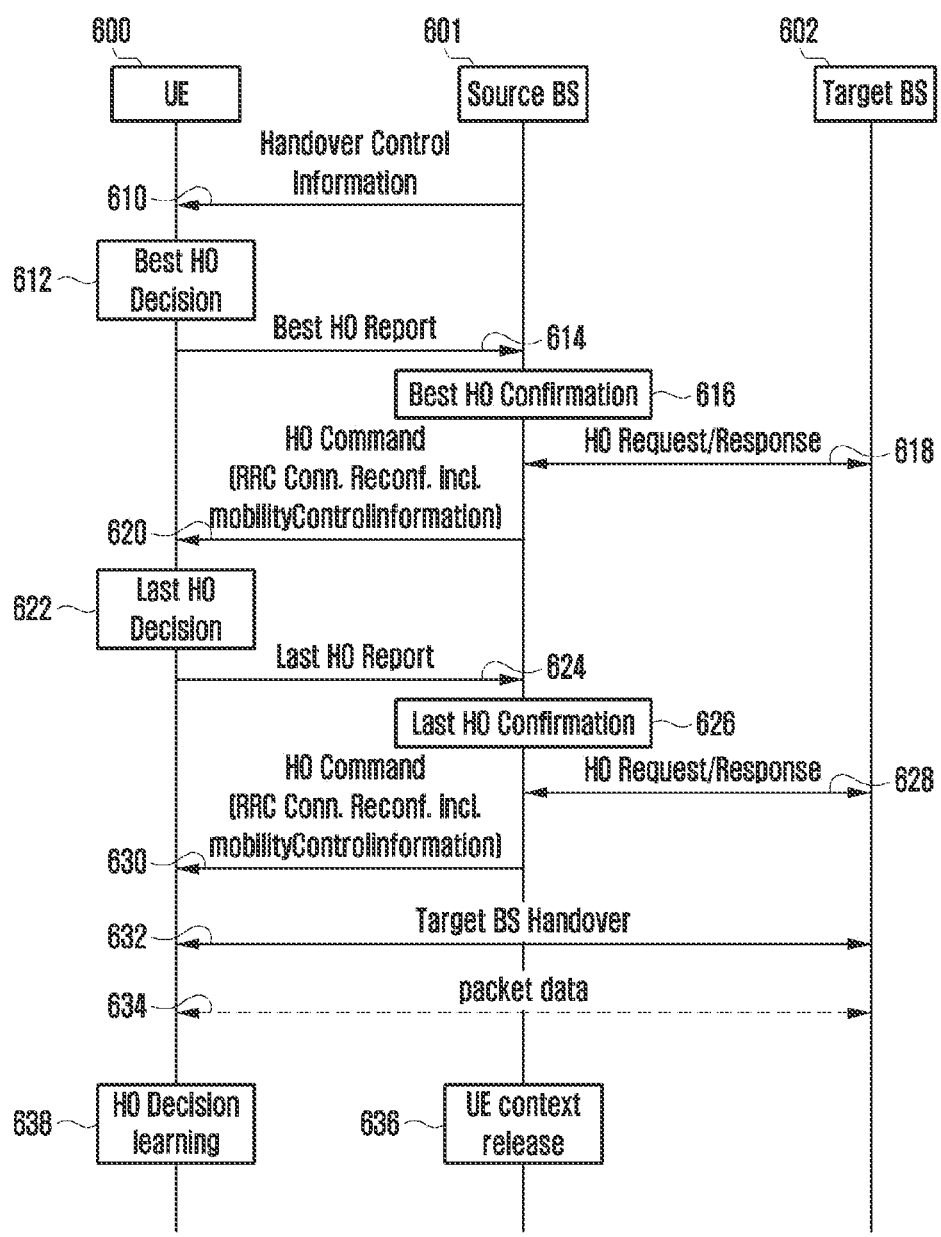
FIG. 6 is a diagram illustrating an example of two types of handover procedures proposed in the disclosure.

FIG. 6 is a diagram illustrating an example of two types of handover procedures in consideration of a best handover (best HO) and a last handover (last HO) proposed in the disclosure. Although both a best handover and a last handover are illustrated in FIG. 6, at least one of the best handover and the last handover may be performed, and the best handover and the last handover are not performed in an orderly manner. The best handover may be, for example, a handover for the purpose of maximizing the quality of a radio signal, and the last handover may be, for example, a handover for the purpose of minimizing disconnection (i.e., connection failure) of a radio signal. Referring to FIG. 6, the method proposed in the disclosure includes a best handover and a last handover. The proposed method is designed in consideration of a time difference between handover determination by a terminal and a handover determination time of a base station. The terminal may make a handover determination and request a handover from the base station. As an example of a handover determination method, the terminal may operate based on artificial intelligence (AI) inside the terminal. An artificial intelligence neural network and a weight for determination of a best handover and a last handover are learnable.

A source base station 601 transmits handover control criteria information (handover control information) to a terminal, in 610. The handover control criteria information refers to at least one of best handover control criteria information and last handover control criteria information, and details will be described later. The terminal measures an intensity of a radio signal and determines whether to perform a best handover via a best-handover determination module, in 612. The best-handover determination module is a module for determining whether to perform a handover in a best situation of the terminal, and may operate based on artificial intelligence. For example, the best-handover determination module may be artificial intelligence that predicts a future radio signal intensity, throughput, or pingpong of the terminal.

When the terminal 600 determines a best handover situation, the terminal 600 makes a best-handover request (best HO report transmission) from the source base station 601, in 614. When making the best-handover request, the terminal transmits the request including information that the base station is able to verify. This is to prevent influence of a communication network due to a reckless handover request of the terminal. For example, in a case of excessive handover of the terminal, a signaling load of the network may increase due to unnecessary pingpong.

The source base station 601 may confirm a best handover in response to the request of the terminal, in 616. When the best handover is confirmed, the source base station 601 makes a handover request of the terminal from the target base station, and the target base station responds with ACK or NACK depending on whether to allow the handover, in 618. When the target base station allows the handover, the source base station transmits a handover command message to the terminal, in 620. The handover command may be, for example, a connection reconfiguration message including information on a target cell for a handover, such as an RRC reconfiguration message including reconfiguration with sync or an RRC connection reconfiguration including mobility control information, etc.

A last-handover determination module is a module that determines whether the terminal makes a handover request from the source base station before a radio link is disconnected, and may operate based on artificial intelligence. For example, the last-handover determination module may be artificial intelligence which predicts a future radio link failure (RLF) of the terminal, predicts the remaining time until the radio link failure, or predicts an intensity of a future radio signal so as to calculate a time remaining until the radio link failure. When the terminal 600 determines in 622 a last handover situation, the terminal 600 makes a last-handover request (last HO report transmission) from the source base station 601, in 624. When making the last-handover request, the terminal transmits the request including information that the base station is able to verify. This is to prevent influence of a communication network due to a reckless handover request of the terminal. For example, in a case of excessive handover of the terminal, a signaling load of the network may increase due to unnecessary pingpong.

The source base station 601 may confirm a last handover in response to the request of the terminal, in 626. When the last handover is confirmed, the source base station 601 requests a handover of the terminal from the target base station 602, and the target base station responds with ACK or NACK depending on whether to allow the handover, in 628. When the target base station allows the handover, the source base station 601 transmits a handover command message to the terminal 600, in 630. The handover command may be, for example, a connection reconfiguration message including information on a target cell for a handover, such as an RRC reconfiguration message including reconfiguration with sync or an RRC connection reconfiguration including mobility control information, etc.

When the handover command is received from the source base station 601, the terminal 600 performs in 632 a handover to the target base station 602, and when the handover is completed, the terminal 600 transmits or receives a packet to or from the target base station 602, in 634. When the handover is completed, the source base station 601 performs UE context release in 636. Via a procedure of learning handover determination, the terminal may continuously measure information (e.g., an intensity of a radio signal) serving as a handover criterion even after the handover, and may compare a measured value with a prediction value of previous handover determination, thereby perform learning when necessary, in 638.

Figure 7:
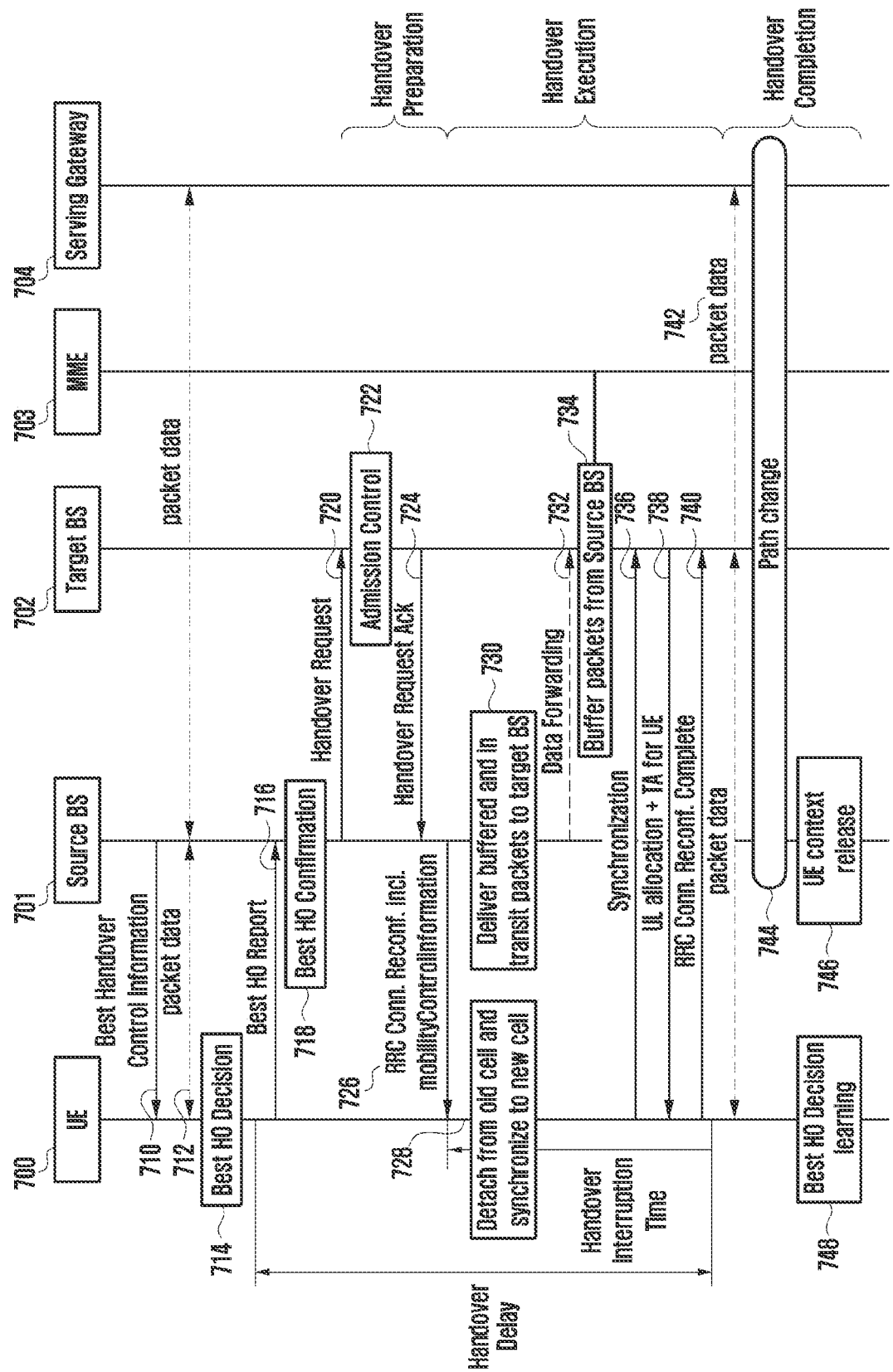
FIG. 7 is a diagram illustrating an example of a best handover procedure proposed in the disclosure.

FIG. 7 is a diagram illustrating an example of a best handover procedure proposed in the disclosure. Referring to FIG. 7, a source base station 701 transmits best handover control criteria information (best handover control information) to a terminal 700, in 710. The best handover control criteria information is information that may be used by the terminal to determine a best handover by using artificial intelligence (AI), and may be, for example, a best handover condition as follows. The terminal may determine that the best handover condition is satisfied, if a corresponding condition described below is satisfied (immediately), if the condition is continuously satisfied a certain number of times or more, if the condition is satisfied for a certain percentage of time or more for a certain time period, if the condition has been satisfied for a certain period of time, and the like. For example, the best handover control criteria information may include one or more pieces of the following information, and one or more combinations of the following information may be used.

- Maximizing the sum of expected radio signal intensities during a best HO measurement period (i.e., a time interval in which an intensity of a radio signal is measured to determine whether to perform HO)
- Maximizing the sum of values obtained by multiplying an expected radio signal intensity by a weight during a best HO measurement period
- Maximizing an expected throughput during a best HO measurement period
- Minimizing a pingpong time (pingpong may indicate that, for a handover, a terminal is disconnected from a source base station, and then the terminal is connected to the source base station again within a certain time)
- Penalty weight ($0 \leq \alpha \leq 1$) of a radio signal intensity or a throughput during pingpong (for example, when the sum of expected throughputs or expected radio signal intensities is calculated, a weight may be applied, during pingpong of the terminal, to a radio signal intensity or throughput during a time interval corresponding to the pingpong.)
- Minimizing an interruption time during a handover
- a radio signal intensity of a source base station+margin<a radio signal intensity of a target base station (in this case, the margin (or offset) value may be included in best handover control criteria information.)
- Information (this can be configured for the terminal in advance) indicating the number of times the described condition is satisfied, a time at which the described condition is satisfied, a certain time and a certain percentage in which the condition needs to be satisfied, and/or the like.

A radio signal in the radio signal intensity refers a radio signal that the terminal is able to measure, which may be, for example, a reference signal and/or a synchronization signal. The radio signal intensity (this may be used interchangeably with radio signal information) refers to one or more combinations of a reference signal received power (RSRP), a reference signal received quality (RSRQ), a received signal strength indicator (RSSI), a signal to interference and noise ratio (SINR), and the like which are radio signal measurement results. The weight may be determined according to an implementation method, and for example, may be determined according to a time or the presence or absence of pingpong. The best handover control criteria information includes information indicating a type of information which should be included when the terminal reports a best handover so that the base station is able to perform verification, or a type of information that the terminal should include. As an example, the best handover control criteria information may indicate so that, when the terminal reports the best handover to the base station, the best handover report includes criterion information, based on which the terminal determines whether to perform the best handover, a radio signal intensity and an expected intensity value of a radio signal, which satisfy the criterion, and/or the like.

As normal communication is performed, data communication between the terminal 700 and the source base station 701 is performed in 712. When the terminal 700 measures a radio signal intensity and determines in 714 via a best-handover determination module that a best handover control criterion is satisfied, the terminal 700 requests in 716 a best handover by transmitting a best handover (HO) report to the source base station 701, wherein the transmission is performed including information required to be included so as to be verifiable by a target base station 702 and/or the source base station 701 during handover reporting. When the best handover report is received, the source base station 701 may identify verification information transmitted by the terminal and may determine the handover to be performed, in 718. The source base station 701 transmits, to the target base station 702, a handover request message for transferring of information necessary for preparing for the handover, in 720. The handover request message may include the verification information transmitted by the terminal. The target base station 702 performs admission control for determination of whether to allow the handover, in 722. In this procedure, the target base station 702 may selectively verify whether the best handover using the verification information transmitted by the terminal is appropriate, and configures a resource required for the terminal to be connected to the target base station 702. When handover preparation is completed, the target base station 702 transmits a handover request ACK message including information necessary for the terminal 700 to be connected to the target base station, in 724.

The terminal 700 receives in 726, from the source base station 701, an RRCConnectionReconfiguration message including a parameter required for the handover, and the message may be referred to as a handover command. The terminal 700 is detached from a previous cell and attempts synchronization for access to a new cell, in 728. The source base station 701 transmits a received packet to the target base station, in 730 and 732. The target base station 702 receives the packet from the source base station 701, and transmits a buffered packet, which is received from the source base station 701, to a core network (or a serving gateway 704), in 734. The terminal 700 performs synchronization to the target base station 702 in 736, and accesses the target base station 702 through an RACH. The target base station 702 allocates a UL resource to the terminal 700, and the terminal 700 responds with an RAR including TA information, in 738. The terminal 700 indicates that the handover is completed, by transmitting an RRCConnectionReconfigurationComplete message, in 740. Thereafter, the terminal 700 may transmit or receive packet data via the target base station 702, in 742.

The target base station 702 performs in 744 a path change procedure with a CN (MME, etc.) 703 in order to notify that the terminal 700 has changed the cell. When a UE context release message is received from the CN 702, the source base station 701 performs UE context release, in 746. After the best handover, the terminal performs, in 748, best-handover determination learning of continuously measuring information predicted when the best handover is determined, and comparing a value predicted by a neural network with an actually measured value, thereby updating a weight of the neural network.

Figure 8:
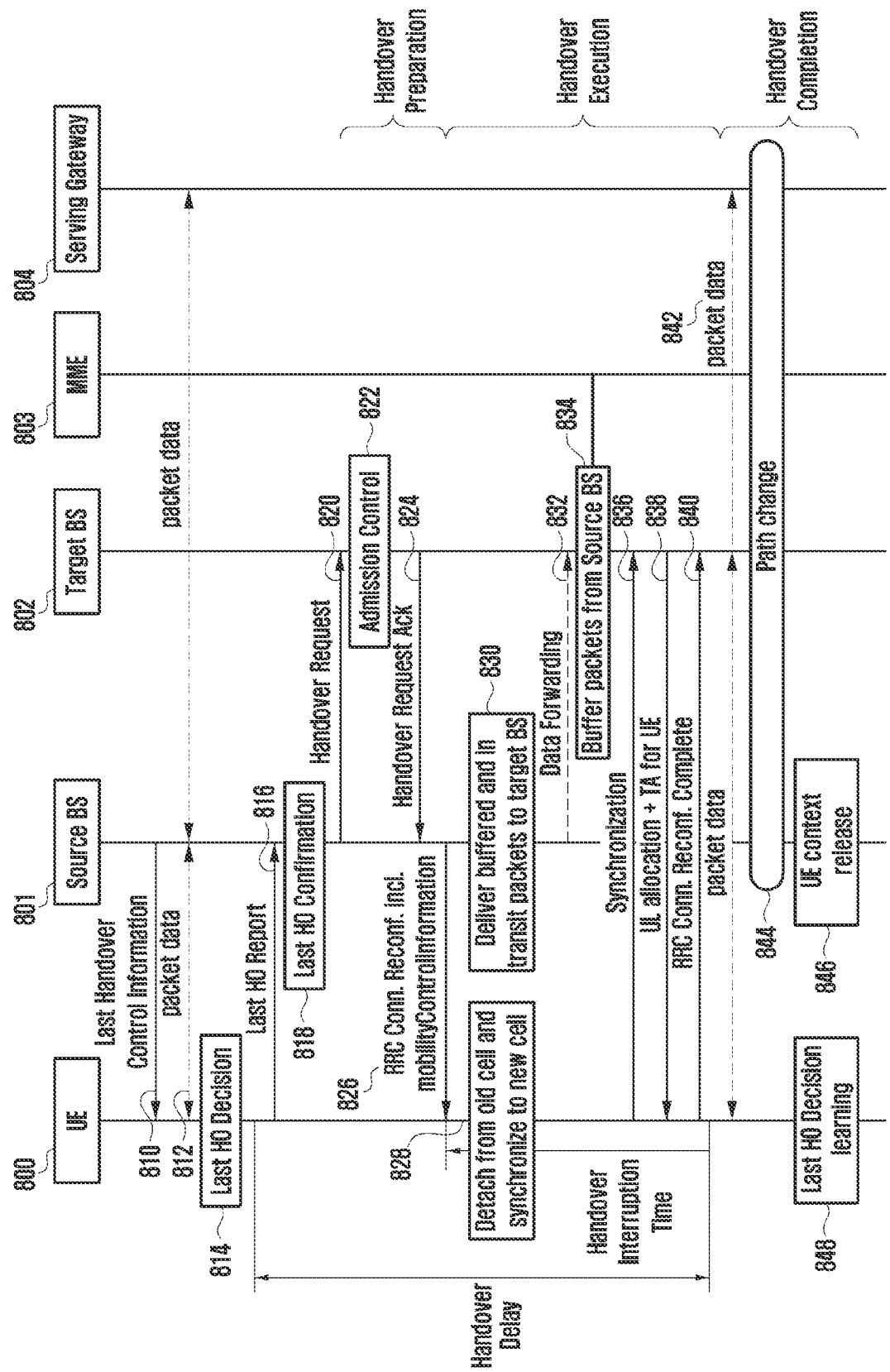
FIG. 8 is a diagram illustrating an example of a last handover procedure proposed in the disclosure.

FIG. 8 is a diagram illustrating an example of a last handover procedure proposed in the disclosure. Referring to FIG. 8, a source base station 801 transmits last handover control criteria information (last handover control information) to a terminal 800, in 810. The last handover control criteria information is information that may be used by the terminal to determine a last handover by using artificial intelligence (AI), and may be, for example, a last handover condition as follows. The terminal may determine that the last handover condition is satisfied, if a corresponding condition described below is satisfied (immediately), if the condition is continuously satisfied a certain number of times or more, if the condition is satisfied for a certain percentage of time or more for a certain time period, if the condition has been satisfied for a certain period of time, and the like. For example, the last handover control criteria information may include one or more pieces of the following information, and one or more combinations of the following information may be used.

Handover margin

Sum of expected radio signal intensities during a last HO measurement period

Expected throughput during a last HO measurement period

Information included in the best handover control criteria information

Information (this can be configured for the terminal in advance) indicating the number of times the described condition is satisfied, a time at which the described condition is satisfied, a certain time and a certain percentage in which the condition needs to be satisfied, and/or the like.

A radio signal in the radio signal intensity refers a radio signal that the terminal is able to measure, which may be, for example, a reference signal and/or a synchronization signal. The radio signal intensity refers to one or more combinations of a reference signal received power (RSRP), a reference signal received quality (RSRQ), a received signal strength indicator (RSSI), a signal to interference and noise ratio (SINR), and the like which are radio signal measurement results. The handover margin is a time required for a source base station to handover a terminal to a target base station and is determined by the source base station. The last handover control criteria information includes information indicating a type of information which should be included when the terminal reports the last handover so that the base station is able to perform verification, or a type of information that the terminal should include. As an example, the last handover control criteria information may, when the terminal reports a last handover to the base station, indicate that the last handover report includes at least one of criterion information, based on which the terminal determines whether to perform a last handover, and/or a time (hereinafter, time-to-RLF (TTR) is described in detail below) until an RLF that satisfies the criterion, a radio signal intensity and an expected intensity value of a radio signal, which satisfy the criterion, a throughput and an expected value of a throughput, and the like.

As normal communication is performed, data communication is performed in 812 between the terminal 800 and the source base station 801. When the terminal measures a radio signal intensity and determines in 814 via a last-handover determination module that a last handover control criterion is satisfied, the terminal requests in 816 a last handover by transmitting a last handover (HO) report to the source base station 801, wherein the transmission is performed including information required to be included so as to be verifiable by a target base station 802 and/or the source base station 801 during last handover reporting. For example, the last-handover determination module may predict a time-to-RLF (TTF), which is a time remaining until an RLF occurs at the current time, by identifying and/or predicting information according to the last handover control criteria information, based on measurement information, such as a radio signal intensity, and if, for example, a corresponding value becomes smaller than a handover margin, the last handover may be determined. Alternatively, for example, if the last handover situation in which a TTR value becomes smaller than the handover margin occurs a determined number of times or the situation is maintained during a certain time interval, the terminal may determine the last handover. This is to prevent a case in which, if the TTR becomes smaller than the handover margin, even when the handover is started, an RLF occurs before handover completion.

When the last handover report is received, the source base station 801 may identify verification information transmitted by the terminal and may determine the handover to be performed, in 818. The source base station 801 transmits, to the target base station 802, a handover request message for transferring of information necessary for preparing for a handover to the target base station 802, in 820. The handover request message may include the verification information transmitted by the terminal. The target base station 802 performs admission control for determination of whether to allow the handover, in 822. In this procedure, the target base station 802 may selectively verify whether the best handover using the verification information transmitted by the terminal is appropriate, and configures a resource required for the terminal to be connected to the target base station 802. When handover preparation is completed, the target base station 802 transmits a handover request ACK message including information necessary for the terminal 800 to be connected to the target base station, in 824.

The terminal 800 receives in 826, from the source base station 801, an RRCConnectionReconfiguration message including a parameter required for the handover, and the message may be referred to as a handover command. The terminal is detached from a previous cell and attempts synchronization for access to a new cell, in 828. The source base station 801 transmits a received packet to the target base station 802, in 830 and 832. The target base station 802 receives the packet from the source base station 801, and transmits a buffered packet, which is received from the source base station 701, to a core network (or a serving gateway 704), in 834. The terminal 800 performs synchronization with the target base station and accesses the target base station through an RACH. The target base station 802 allocates a UL resource to the terminal 800, and the terminal 800 responds with an RAR including TA information, in 838. The terminal indicates that the handover is completed, by transmitting an RRCConnectionReconfigurationComplete message, in 840. Thereafter, the terminal 800 may transmit or receive packet data via the target base station 802, in 842.

The target base station 802 performs in 804 a path change procedure with a CN (MME, etc.) 803 in order to notify that the terminal 800 has changed the cell. When a UE context release message is received from the CN 803, the source base station 801 performs UE context release, in 846. After the last handover, the terminal 800 performs, in 848, last-handover determination learning of continuously measuring information predicted when the last handover is determined, and comparing a value predicted by a neural network with an actually measured value, thereby updating a weight of the neural network.

In FIG. 7 and FIG. 8, the core network (CN) may be a network for EPC, 5GC, or cellular communication, the MME may be a node that manages an access and mobility management function (AMF) or mobility of the terminal in the network, and the serving gateway (S-GW) may be a node that supports a user plane function supporting a data connection to Internet, a packet data network (PDN), or a user plane function (UPF). Although names of specific messages are described in FIG. 7 and FIG. 8, the disclosure is not limited thereto, and the messages may be replaced with messages performing the same or similar roles, so as to be applied.

Figure 9:
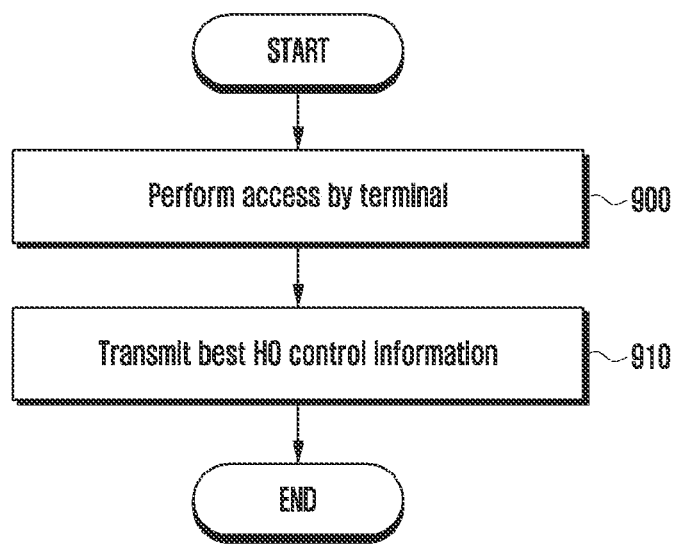
FIG. 9 is a diagram illustrating an example of an operation for internal processing which is for a base station to transmit best handover control criteria information in order to support a best handover.

FIG. 9 is a diagram illustrating an example of an operation for internal processing which is for a base station to transmit best handover control criteria information in order to support a best handover.

Referring to FIG. 9, a base station identifies in 900 access of a terminal and transmits in 910 best handover control criteria information to the terminal. The access of a terminal refers to a case in which the terminal is handed over from another base station, is connected to a base station from an idle state or inactive state to a connected state or the like, such as an attach, new traffic, tracking area update (TAU), and RAN-based notification area update (RNAU). For the content of the best handover control criteria information, reference may be made to the above description. The best handover control criteria information can be transmitted by the base station as shown in FIG. 9 or can be also preconfigured.

Figure 10:
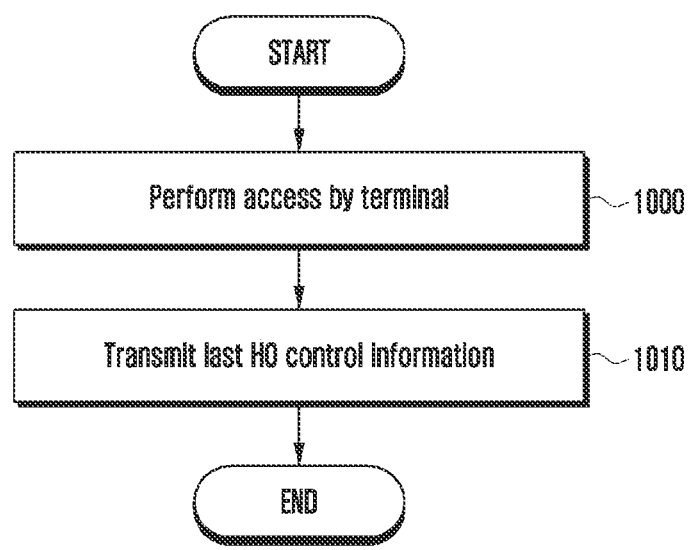
FIG. 10 is a diagram illustrating an example of an operation for internal processing which is for a base station to transmit last handover control criteria information in order to support a last handover.

FIG. 10 is a diagram illustrating an example of an operation for internal processing which is for a base station to transmit last handover control criteria information in order to support a last handover.

Referring to FIG. 10, a base station identifies in 1000 access of a terminal and transmits in 1010 last handover control criteria information to the terminal. The access of a terminal refers to a case in which the terminal is handed over from another base station, is connected to a base station from an idle state or inactive state to a connected state or the like, such as an attach, new traffic, tracking area update (TAU), and RAN-based notification area update (RNAU). For the content of the last handover control criteria information, reference may be made to the above description. The best handover control criteria information can be transmitted by the base station as shown in FIG. 9 or can be also preconfigured.

Figure 11:
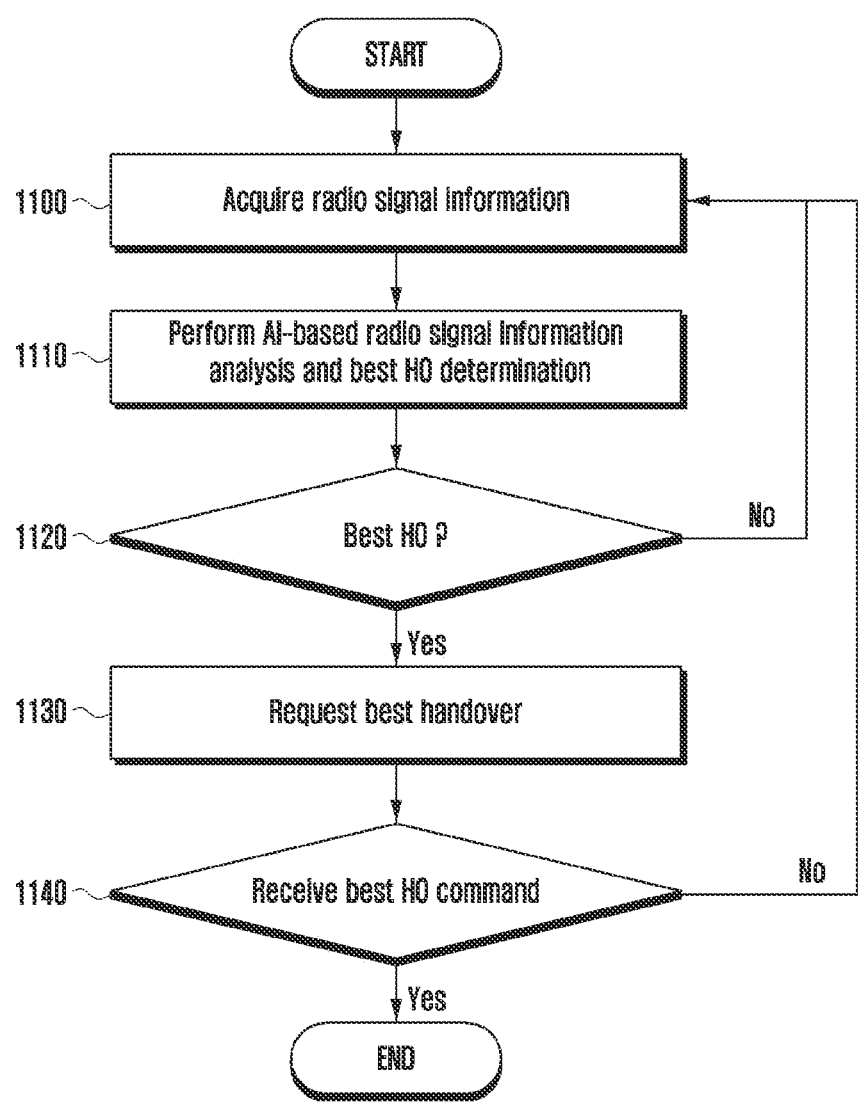
FIG. 11 is a diagram illustrating a first embodiment for a terminal to determine a best handover.

FIG. 1 is a diagram illustrating a first embodiment for a terminal to determine a best handover. FIG. 11 is a diagram illustrating a detailed operation in operation 714 of FIG. 7. According to FIG. 11, in operation 1100, the terminal acquires radio signal information, etc. necessary for determining a best handover according to best handover control criteria information. The radio signal information may correspond to, for example, the aforementioned radio signal intensity. In operation 1110, the terminal analyzes, based on AI (neural network), the acquired radio signal information to determine the best handover. A detailed configuration method of the neural network may vary depending on an implementation method of the base station. For example, operation 1110 may be configured by a neural network that predicts future radio signal information, based on collected radio signal information, and a neural network that determines the best handover, based on predicted radio signal information.

In operation 1120, the terminal determines correspondence to the best handover, and in a case of not corresponding to the best handover according to a determination result, the terminal continues to acquire radio signal information in operation 1100. In a case of corresponding to the best handover according to the determination result, the terminal transmits the best handover report of FIG. 7 to the base station in 716, so as to make a best-handover request, in 1130. The terminal then determines whether a best handover command is received from the base station, in 1140. Even if the terminal has transmitted the best handover report, if the handover is verified and admitted by determination of the base station, and thus no best handover command is received, the terminal cannot perform the handover. If no best handover command is received, the terminal continues to acquire radio signal information and determines whether to perform a new best handover, in operation 1100. If a best handover command is received, a best handover procedure is performed.

Figure 12:
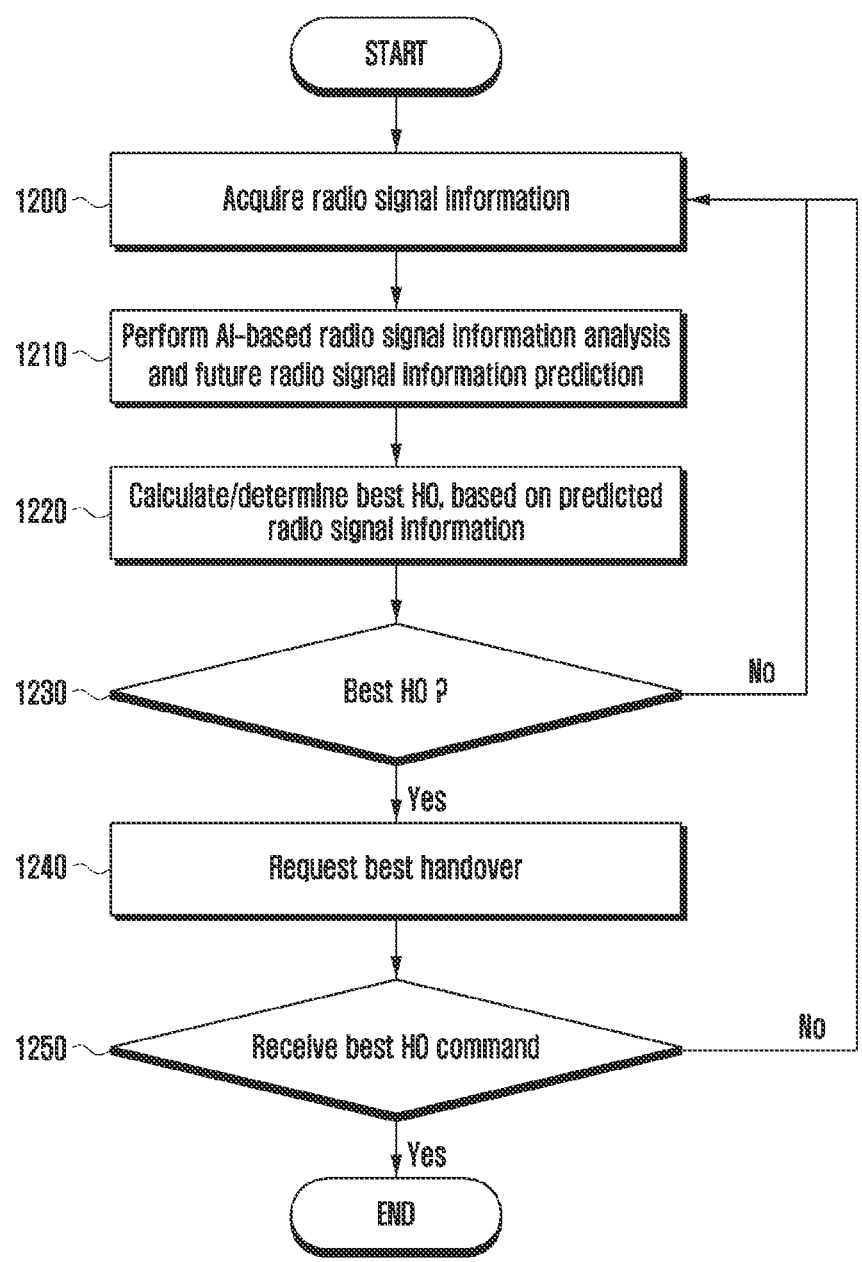
FIG. 12 is a diagram illustrating a second embodiment for the terminal to determine a best handover.

FIG. 12 is a diagram illustrating a second embodiment for the terminal to determine a best handover.

FIG. 12 is a diagram illustrating a detailed operation in operation 714 of FIG. 7. According to FIG. 12, in operation 1200, the terminal acquires radio signal information, etc. necessary for determining a best handover according to best handover control criteria information. The radio signal information may correspond to, for example, the aforementioned radio signal intensity. In operation 1210, the terminal analyzes, based on AI (neural network), the acquired radio signal information to predict a future radio signal intensity. A detailed configuration method of the neural network may vary depending on an implementation method of the base station. In operation 1220, the terminal calculates or determines correspondence to the best handover, based on the predicted radio signal intensity.

In operation 1230, the terminal determines correspondence to the best handover, and in a case of not corresponding to the best handover according to the analysis result in operation 1220, the terminal returns to operation 1200 and continues to acquire radio signal information. In a case of corresponding to the best handover according to the analysis result, the terminal transmits the best handover report of FIG. 7 to the base station in 716, so as to make a best-handover request, in 1240. The terminal then determines whether a best handover command is received from the base station, in 1250. Even if the terminal has transmitted the best handover report, if the handover is verified and admitted by determination of the base station, and thus no best handover command is received, the terminal continues to acquire radio signal information and determines a new best handover, in operation 1200. If a best handover command is received, a handover procedure is performed.

Figure 13:
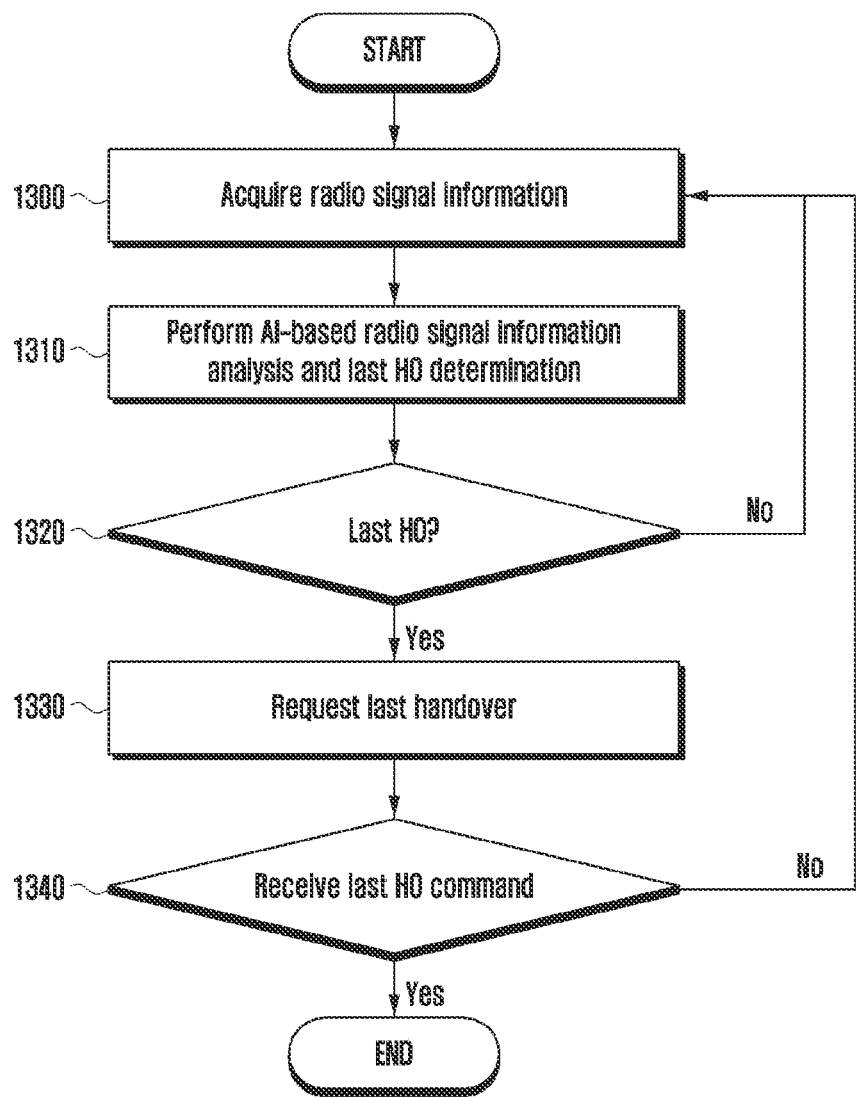
FIG. 13 is a diagram illustrating a third embodiment for the terminal to determine a last handover.

FIG. 13 is a diagram illustrating a third embodiment for the terminal to determine a last handover. FIG. 13 is a diagram illustrating a detailed operation in operation 814 of FIG. 8. According to FIG. 13, in operation 1300, the terminal acquires radio signal information, etc. necessary for determining a last handover according to a last handover control criterion. The radio signal information may correspond to, for example, the aforementioned radio signal intensity. In operation 1310, the terminal determines whether to perform the last handover by analyzing, based on AI (neural network), a handover margin value configured or preconfigured from the base station and the acquired radio signal information. A detailed configuration method of the neural network may vary depending on an implementation method of the base station. For example, operation 1310 may be configured by a neural network that predicts future radio signal information, based on the acquired radio signal information, and a neural network that determines the best handover, based on predicted radio signal information and the handover margin.

In operation 1320, the terminal determines correspondence to the last handover, and in a case of not corresponding to the last handover, the terminal returns to operation 1300 and continues to acquire radio signal information. In a case of corresponding to the last handover according to a determination result, the terminal transmits the last handover report of FIG. 8 to the base station in 816, so as to make a last-handover request, in 1330. The terminal then determines whether a last handover command is received from the base station, in 1340. Even if the terminal has transmitted the last handover report, if the handover is verified and admitted by determination of the base station, and thus no last handover command is received, the terminal continues to acquire radio signal information and determines a new last handover, in operation 1300. If a last handover command is received, a handover procedure is performed.

Figure 14:
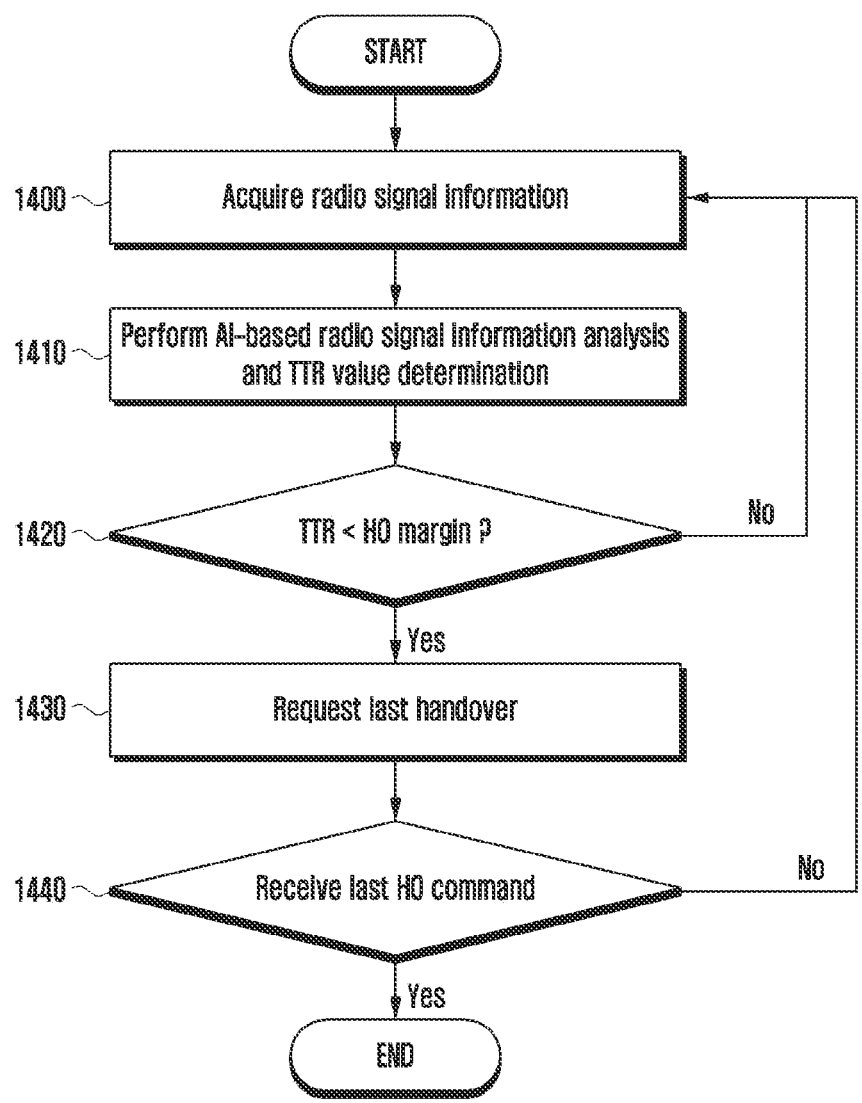
FIG. 14 is a diagram illustrating a fourth embodiment for the terminal to determine a last handover.

FIG. 14 is a diagram illustrating a fourth embodiment for the terminal to determine a last handover. FIG. 14 is a diagram illustrating a detailed operation in operation 814 of FIG. 8. According to FIG. 14, in operation 1400, the terminal collects radio signal information, etc. necessary for determining a last handover according to last handover control criteria information. In operation 1410, the terminal determines a TTR value by analyzing, based on AI (neural network), the collected radio signal information. A detailed configuration method of the AI (neural network) may vary depending on an implementation method of the base station. Specifically, in operation 1420, the terminal determines whether to perform the last handover, by using a predicted TTR value and a handover margin value configured or pre-configured from the base station. For example, the terminal may determine the last handover by comparing the TTR value with the HO margin value.

If the TTR value is smaller than the handover margin value, the terminal may transmit in 816 the last handover report of FIG. 8 to the base station so as to request the last handover in 1430, and if the TTR value is not smaller than the HO margin value, the terminal returns to operation 1400 and continues to acquire radio signal information. The terminal then determines whether a last handover command is received from the base station, in 1440. Even if the terminal has transmitted the last handover report, if the handover is verified and admitted by determination of the base station, and thus no last handover command is received, the terminal continues to acquire radio signal information and determines a new last handover, in operation 1400. If a last handover command is received, a handover procedure is performed.

Figure 15:
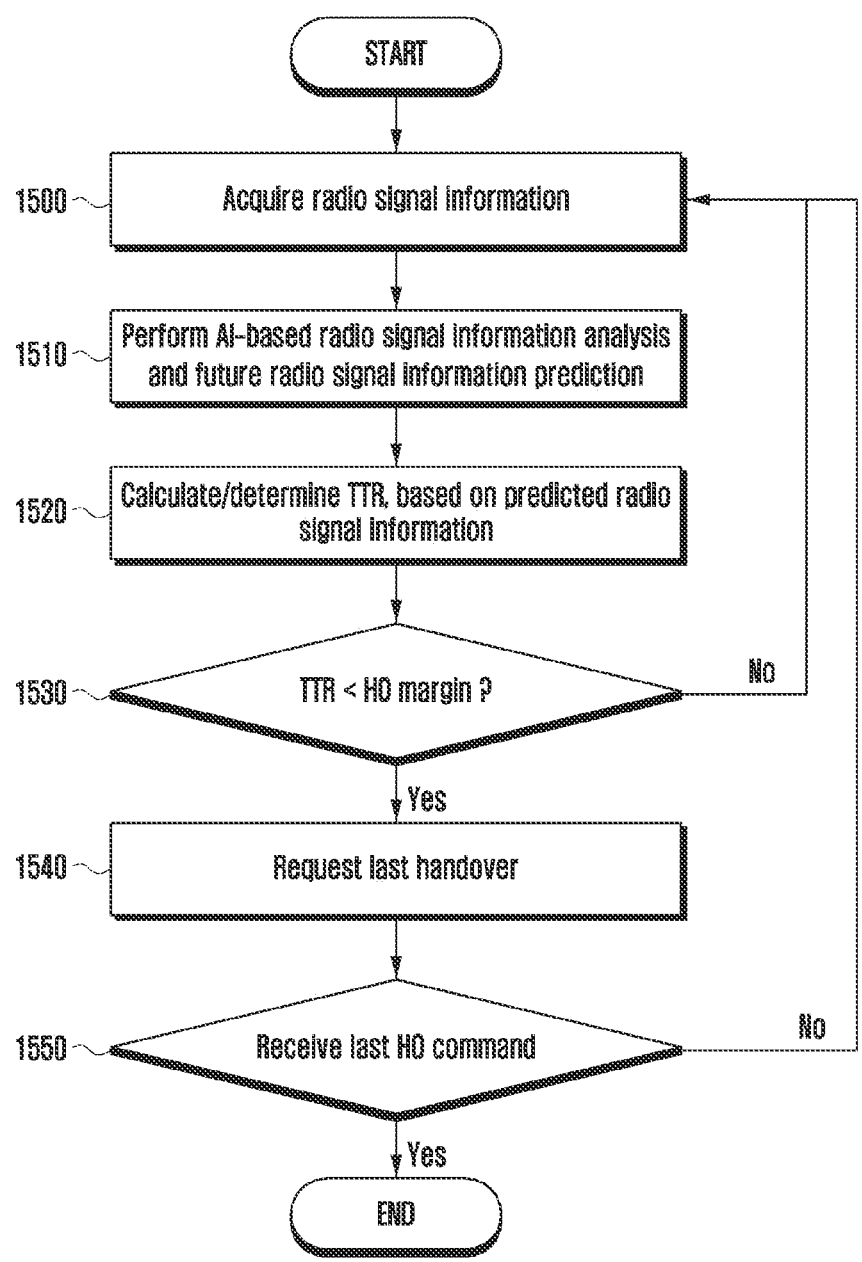
FIG. 15 is a diagram illustrating a fifth embodiment for the terminal to determine a last handover.

FIG. 15 is a diagram illustrating a fifth embodiment for the terminal to determine a last handover. FIG. 15 is a diagram illustrating a detailed operation in operation 814 of FIG. 8. According to FIG. 15, in operation 1500, the terminal acquires radio signal information, etc. necessary for determining a last handover according to last handover control criteria information. In operation 1510, the terminal analyzes, based on AI (neural network), the acquired radio signal information to predict a future radio signal intensity. A detailed configuration method of the AI (neural network) may vary depending on an implementation method of the base station. In operation 1520, the terminal calculates or determines a TTR value, by using the predicted radio signal intensity. In operation 1530, the terminal determines whether to perform the last handover, based on the predicted TTR value and a handover margin value configured or pre-configured from the base station. For example, the terminal may determine the last handover by comparing the TTR value with the HO margin value.

For example, if the TTR value is smaller than the handover margin value, the terminal may transmit in 816 the last handover report of FIG. 8 to request the last handover in 1540, and if the TTR value is not smaller than the HO margin value, the terminal returns to operation 1500 and continues to acquire radio signal information. The terminal then determines whether a last handover command is received from the base station, in 1550. Even if the terminal has transmitted the last handover report, if the handover is verified and admitted by determination of the base station, and thus no last handover command is received, the terminal continues to acquire radio signal information and determines anew last handover, in operation 1500. If a last handover command is received, a handover procedure is performed.

Hereinafter, a model learning procedure of a neural network of the terminal that determines a best or a last handover will be described.

Figure 16:
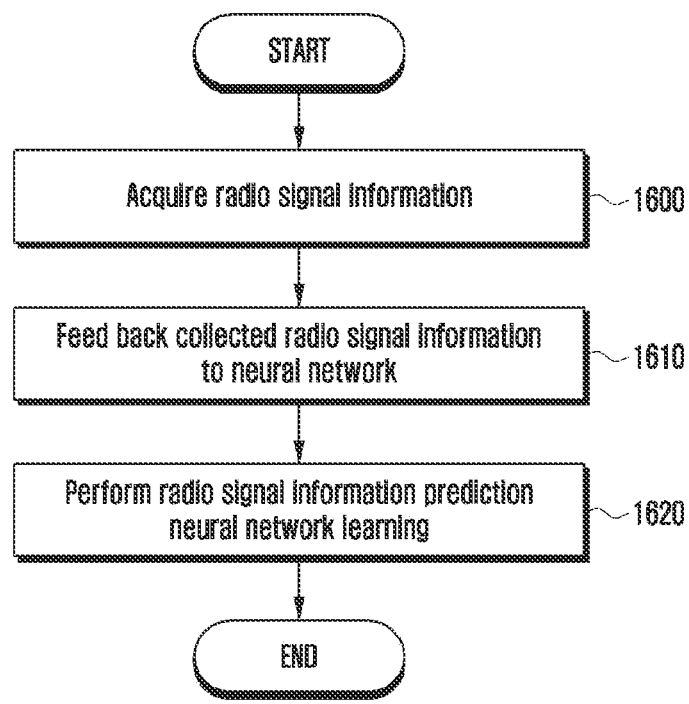
FIG. 16 is a diagram illustrating a model learning procedure of the terminal in the second embodiment and the fifth embodiment.

FIG. 16 is a diagram illustrating a model learning procedure of the terminal in the second embodiment and the fifth embodiment. In operation 748 of FIG. 7 and operation 848 of FIG. 8, the terminal learns the best handover and last-handover determination methods. When the terminal operates based on the second embodiment, in the terminal, the neural network which predicts a future radio signal intensity based on a past radio signal intensity operates (operation 1210 in FIG. 12). When the terminal operates based on the fifth embodiment, in the terminal, the neural network which predicts a future radio signal intensity based on a past radio signal intensity operates (operation 1510 in FIG. 15).

Referring to FIG. 16, in the cases of the second embodiment and the fifth embodiment, the terminal acquires a radio signal intensity in operation 1600. In operation 1610, the terminal feeds back the acquired radio signal intensity to the neural network, and the terminal performs neural network learning in 1620, based on the acquired actual radio signal intensity and a radio signal intensity predicted in the past (based on radio signal information). The neural network learning may refer to comparing a radio signal intensity predicted based on a radio signal intensity acquired in the past with a radio signal intensity acquired via actual measurement, thereby identifying and/or changing a weight used for calculation to predict a radio signal intensity. This learning may be performed periodically even when handover determination is initiated or not.

Figure 17:
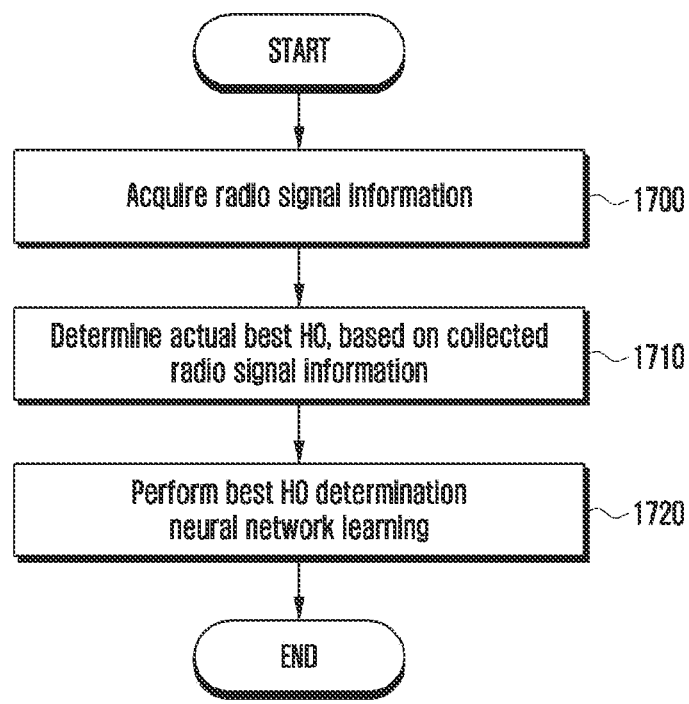
FIG. 17 is a diagram illustrating a model learning procedure of the terminal in the first embodiment.

FIG. 17 is a diagram illustrating a model learning procedure of the terminal in the first embodiment. In operation 748 of FIG. 7, the terminal learns a best handoff determination method. When the terminal operates based on the first embodiment, in the terminal, the neural network which determines whether to perform a best handover, based on a previous radio signal intensity operates (operation 1110 in FIG. 11). Referring to FIG. 17, in operation 1700, the terminal acquires a radio signal intensity. In operation 1710, the terminal calculates and determines whether to actually perform a best handover, based on the acquired radio signal intensity, and feeds back a result thereof to the neural network. In operation 1720, the terminal performs neural network learning by comparing whether to perform the best handover predicted (based on the previous radio signal intensity) with whether to perform the best handover calculated (based on the acquired actual radio signal intensity). The neural network learning may refer to comparing whether to perform a best handover predicted based on a radio signal intensity acquired in the past with whether to perform a best handover calculated based on a radio signal intensity acquired via actual measurement, thereby identifying and/or changing a weight used for calculation to predict whether to perform a best handover. This learning may be performed periodically even when handover determination is initiated or not.

Figure 18:
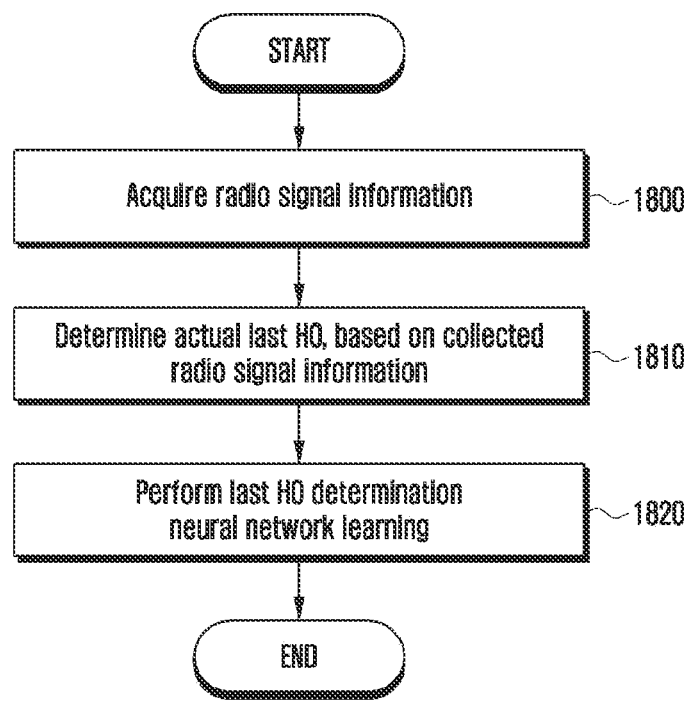
FIG. 18 is a diagram illustrating a model learning procedure of the terminal in the third embodiment.

FIG. 18 is a diagram illustrating a model learning procedure of the terminal in the third embodiment. In operation 848 of FIG. 8, the terminal learns a last handoff determination method. When the terminal operates based on the third embodiment, in the terminal, the neural network which determines whether to perform a last handover, based on a previous radio signal intensity operates (operation 1310 in FIG. 13).

Figure 19:
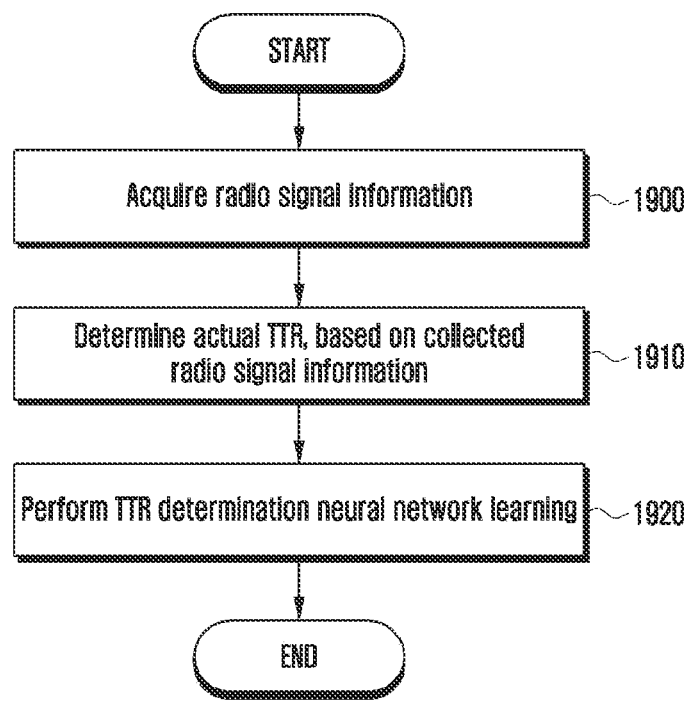
FIG. 19 is a diagram illustrating a model learning procedure of the terminal in the fourth embodiment.

Referring to FIG. 18, in operation 1800, the terminal acquires a radio signal intensity. In operation 1810, the terminal calculates and determines whether to actually perform a last handover, based on the acquired radio signal intensity, and feeds back a result thereof to the neural network. In operation 1820, the terminal performs neural network learning by comparing whether to perform the last handover predicted (based on the previous radio signal intensity) with whether to perform the last handover calculated (based on the acquired actual radio signal intensity). The neural network learning may refer to comparing whether to perform a last handover predicted based on a radio signal intensity acquired in the past with whether to perform a last handover calculated based on a radio signal intensity acquired via actual measurement, thereby identifying and/or changing a weight used for calculation to predict whether to perform a last handover. This learning may be performed periodically even when handover determination is initiated or not. FIG. 19 is a diagram illustrating a model learning procedure of the terminal in the fourth embodiment. In operation 848 of FIG. 8, the terminal learns a last handoff determination method. When the terminal operates based on the fourth embodiment, in the terminal, the neural network which determines a TTR value, based on a previous radio signal intensity operates (operation 1410 in FIG. 14).

Referring to FIG. 19, in operation 1900, the terminal acquires a radio signal intensity. In operation 1910, the terminal calculates and determines an actual TTR value, based on the acquired radio signal intensity, and feeds back a result thereof to the neural network. In operation 1920, the terminal performs neural network learning by comparing the TTR value predicted (based on the previous radio signal intensity) with the TTR value calculated (based on the acquired actual radio signal intensity). In order to calculate the TTR value, an RLF time point needs to be identified, in which case, the terminal may use a conventional RLF determination method or a new RLF determination method, and in a case where an actual RLF has occurred, the TTR value may reflect a point in time at which the actual RLF has occurred. The neural network learning may refer to comparing whether to perform a best handover predicted based on a radio signal intensity acquired in the past with whether to perform a best handover calculated based on a radio signal intensity acquired via actual measurement, thereby identifying and/or changing a weight used for calculation to predict whether to perform a best handover. This learning may be performed periodically even when handover determination is initiated or not.

Figure 20:
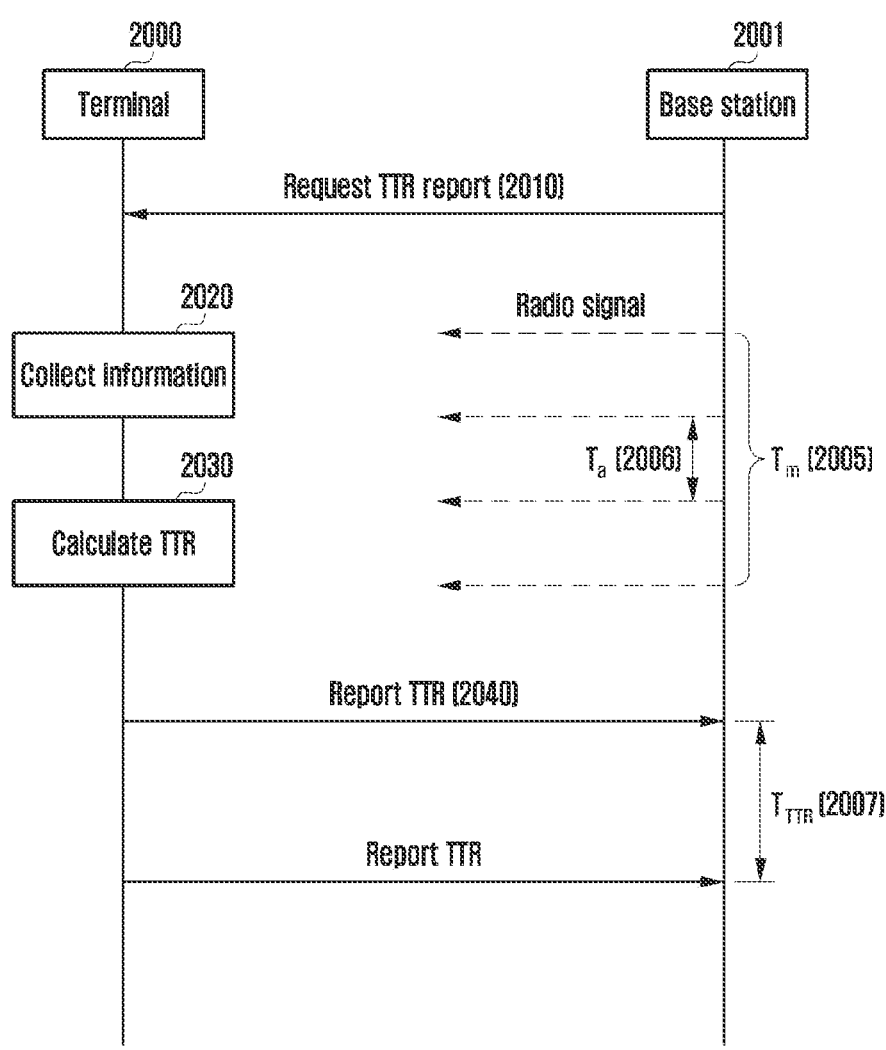
FIG. 20 is a diagram illustrating an example of a procedure of reporting a TTR to a base station by a terminal.

FIG. 20 is a diagram illustrating an example of a procedure of reporting a TTR to a base station by a terminal. Referring to FIG. 20, a terminal 2000 may measure and acquire a radio signal intensity of a radio signal transmitted by a base station 2001, and calculate an expected TTR value so as to report the same to the base station. Specifically, the base station 2001 transmits, to the terminal, TTR report configuration information for configuration of a TTR report, in 2010. The TTR report configuration information may include information on an occurrence criterion of an event in which the terminal reports a TTR value for aperiodic TTR reporting, TTR report period configuration information for periodic TTR reporting, and/or the like. For example, the configuration information may include at least one of a type (this may include an event, such as A1, A2, and A3 for transmission of a conventional measurement report) of the TTR report event, the aforementioned best-handover determination criterion information, last-handover determination criterion information, or the like, and may include parameter values for the event and determination. Information indicating a period of radio signal measurement, a length of a measurement interval for TTR calculation, etc. may be included.

The terminal 2000 measures, periodically or when a configured TTR report condition is satisfied, a radio signal intensity at each radio signal measurement period $T_a$ 2006 to acquire information in 2020, and calculates a TTR value by using a radio signal intensity measured during a certain time $T_m$ 2005 in 2030. Thereafter, the terminal 2000 reports a predicted TTR value to the base station 2007, in 2040. This report may be performed by higher layer signaling, and the TTR value may be included in a measurement report or a separate message so as to be transmitted to the base station 2001. In a case of the periodic TTR report, this report period may be the same as the $T_{TTR}$ 2007, which may be preconfigured or configured.

Figure 21:
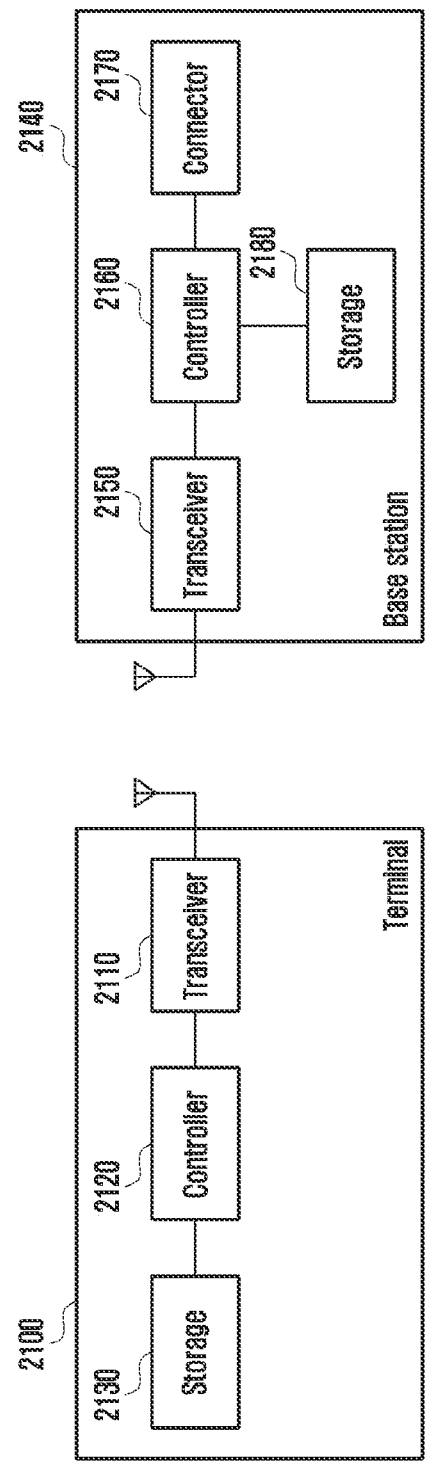
FIG. 21 is a block diagram illustrating a terminal and a base station device capable of performing the disclosure.

FIG. 21 is a block diagram illustrating a terminal and a base station device capable of performing the disclosure. According to FIG. 21, a terminal 2100 includes a transceiver 2110, a controller 2120, and a storage unit 2130. Elements of the terminal 2100 are not limited to the aforementioned example, and for example, the terminal 2100 may include more elements or may include fewer elements than the illustrated elements. In addition, the transceiver 2110, the storage unit 2130, and the controller 2120 may be implemented in the form of a single chip.

The transceiver 2110 may transmit a signal to and receive a signal from a base station 2140. Here, the signal may include control information and data. To this end, the transceiver 2110 may include an RF transmitter configured to perform up-conversion and amplification of a frequency of a transmitted signal, an RF receiver configured to perform low-noise amplification of a received signal and perform down-conversion of a frequency, and the like. However, this is merely an embodiment of the transceiver 2110, and elements of the transceiver 2110 are not limited to the RF transmitter and the RF receiver. Further, the transceiver 2110 may receive a signal through a radio channel, may output the signal to the controller 2120, and may transmit a signal output from the controller 2120 through the radio channel. The transceiver 2110 may include an RF transceiver for a first wireless communication technology and an RF transceiver for a second wireless communication technology, respectively, or may perform physical layer processing according to the first wireless communication technology and the second wireless communication technology by using one transceiver.

The storage unit 2130 may store programs and data necessary for an operation of the terminal 2100. The storage unit 2130 may store control information or data included in a signal transmitted or received by the terminal 2100. The storage unit 2130 may include a storage medium or a combination of storage media, such as a ROM, a RAM, a hard disk, a CD-ROM, and a DVD. There may be multiple storage units 2130.

The controller 2120 may control a series of procedures so that the terminal 2100 may operate according to the aforementioned embodiment of the disclosure. For example, the controller 2120 may perform best-handover determination or last-handover determination, based on best handover control criteria information and/or last handover control criteria information which are received from the base station 2140 via the transceiver 2110. There may be multiple controllers 2120, and the controller 2120 may control the elements of the terminal 2100 by executing a program stored in the memory 2130.

The base station 2140 includes a transceiver 2150, a controller 2160, a connector 2170, and a storage unit 2180. Elements of the base station 2140 are not limited to the aforementioned example, and for example, the base station 2140 may include more elements or may include fewer elements than the illustrated elements. In addition, the transceiver 2150, the storage unit 2180, the controller 2160, and the like may be implemented in the form of a single chip.

The transceiver 2150 may transmit a signal to or receive a signal from the terminal 2100. Here, the signal may include control information and data. To this end, the transceiver 2150 may include an RF transmitter configured to perform up-conversion and amplification of a frequency of a transmitted signal, an RF receiver configured to perform low-noise amplification of a received signal and perform down-conversion of a frequency, and the like. However, this is merely an embodiment of the transceiver 2150, and elements of the transceiver 2150 are not limited to the RF transmitter and the RF receiver. Further, the transceiver 2150 may receive a signal through a radio channel, may output the signal to the controller 2160, and may transmit a signal output from the controller 2160 through the radio channel.

The controller 2160 may control a series of procedures so that the base station 2140 may operate according to the aforementioned embodiment of the disclosure. For example, the controller 2160 may generate best handover control criteria information and/or last handover control criteria information, which are to be transmitted to the terminal 2100, and may transmit the same to the terminal 2100 via the transceiver 2150. There may be multiple controllers 2160, and the controller 2160 may control the elements of the base station 2140 by executing a program stored in the storage unit 2180.

The storage unit 2180 may store programs and data necessary for an operation of the base station. The storage unit 2180 may store control information or data included in a signal transmitted or received by the base station. The storage unit 2180 may include a storage medium or a combination of storage media, such as a ROM, a RAM, a hard disk, a CD-ROM, and a DVD. There may be multiple storage units 2140.

The connector 2170 is a device that connects the base station 2140 and a core network, and may perform physical layer processing for message transmission or reception, transmit a message to the core network, and receive a message from the core network.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary.

The invention claimed is:

1. A method, performed by a terminal, for a handover in a wireless communication system, the method comprising:
receiving, from a source base station, first control information for a last handover from a base station, wherein the first control information includes a handover margin indicating a time required for the source base station to handover the terminal to a target base station;
determining whether to perform the last handover, based on the first control information and radio signal information acquired via measurement of a radio signal;
in case that the terminal determines to perform the last handover, transmitting, to the source base station, a handover request message; and
determining whether a handover command message is received from the source base station.

2. The method of claim 1, further comprising:
receiving, from the source base station, second control information for a best handover, wherein the second control information includes information indicating at least one of maximization of a sum of predicted radio signal intensities during a radio signal measurement interval for a handover, maximization of a predicted throughput during the radio signal measurement interval for the handover, minimization of a pingpong time, and minimization of a handover interruption time, and a handover margin.

3. The method of claim 2, further comprising:
based on radio signal information acquired via a neural network, determining whether to perform the best handover, depending on whether a best handover criterion determined based on the second control information is satisfied.

4. The method of claim 1, wherein the determining of whether to perform the last handover comprises:
determining a time-to-radio link failure (TTR) value, based on radio signal information acquired via a neural network; and
determining whether to perform the last handover, based on the determined TTR value and the handover margin,
wherein the TTR value is a time remaining until a radio link failure (RLF) occurs at a current time.

5. The method of claim 1, wherein the determining of whether to perform the last handover comprises:
identifying future radio signal information, based on radio signal information acquired via a neural network;
determining a time-to-radio link failure (TTR) value, based on the future radio signal information; and
determining whether to perform the last handover, based on the determined TTR value and the handover margin,
wherein the TTR value is a time remaining until a radio link failure (RLF) occurs at a current time.

6. The method of claim 1, wherein the handover request message includes at least one of a time-to-radio link failure (TTR) value, radio signal strength, or a throughput value that serves as a criterion for the terminal to determine to perform the last handover.

7. The method of claim 1, further comprising:
in case that the handover command message is received, performing synchronization with the target base station, and
in case that the handover command message is not received, measuring the radio signal.

8. A terminal for a handover in a wireless communication system, the terminal comprising:
a transceiver; and
a controller connected to the transceiver and configured to:
receive, from a source base station, first control information for a last from a base station, wherein the first control information includes a handover margin indicating a time required for the source base station to handover the terminal to a target base station,
determine whether to perform the last handover, based on the first control information and radio signal information acquired via measurement of a radio signal,
in case that the terminal determines to perform the last handover, transmit, to the source base station, a handover request message, and
determine whether a handover command message is received from the source base station.

9. The terminal of claim 8, wherein the controller is further configured to:
receive, from the source base station, second control information for a best handover, wherein the second control information includes information indicating at least one of maximization of the sum of predicted radio signal intensities during a radio signal measurement interval for a handover, maximization of a predicted throughput during the radio signal measurement interval for the handover, minimization of a pingpong time, and minimization of a handover interruption time.

10. The terminal of claim 2, wherein the controller is configured to:
based on radio signal information acquired via a neural network, determine whether to perform the best handover, depending on whether a best handover criterion determined based on the second control information is satisfied, or
identify future radio signal information, based on the radio signal information acquired via the neural network, and determine, based on the future radio signal information, whether to perform the best handover, depending on whether the best handover criterion determined based on the second control information is satisfied.

11. The terminal of claim 8, wherein, for determining whether to perform the last handover, the controller is configured to further control to
determine a time-to-radio link failure (TTR) value, based on radio signal information acquired via a neural network, and
determine whether to perform the last handover, based on the determined TTR value and the handover margin, and
wherein the TTR value is a time remaining until a radio link failure (RLF) occurs at a current time.

12. The terminal of claim 8, wherein, for determining whether to perform the last handover, the controller is configured to:
identify future radio signal information, based on radio signal information acquired via a neural network,
determine a time-to-radio link failure (TTR) value, based on the future radio signal information, and
determine whether to perform the last handover, based on the determined TTR value and the handover margin, and
wherein the TTR value is a time remaining until an a radio link failure (RLF) occurs at a current time.

13. The terminal of claim 8, wherein the handover request message includes at least one of a time-to-radio link failure (TTR) value, radio signal strength, or a throughput that serves as a criterion for the terminal to determine to perform the last handover.

14. The terminal of claim 8, wherein the controller is further configured to:
in case that the handover command message is received, perform synchronization with the target base station, and
in case that the handover command message is not received, measure the radio signal.

* * * * *